US010445680B2

United States Patent
Hasija et al.

(10) Patent No.: US 10,445,680 B2
(45) Date of Patent: Oct. 15, 2019

(54) ENGINE FOR MODELING AND EXECUTING CUSTOM BUSINESS PROCESSES

(71) Applicant: Azuqua, Inc., Seattle, WA (US)

(72) Inventors: Nikhil Hasija, Issaquah, WA (US); Craig Howard Unger, Bellevue, WA (US); Alec James Embke, Seattle, WA (US)

(73) Assignee: Azuqua, Inc., Seattle, WA (US)

( * ) Notice: Subject to any disclaimer, the term of this patent is extended or adjusted under 35 U.S.C. 154(b) by 0 days.

(21) Appl. No.: 15/423,508

(22) Filed: Feb. 2, 2017

(65) Prior Publication Data

US 2018/0218295 A1    Aug. 2, 2018

(51) Int. Cl.
  *G06Q 10/06*  (2012.01)
  *G06F 8/10*  (2018.01)

(52) U.S. Cl.
  CPC .......... *G06Q 10/067* (2013.01); *G06F 8/10* (2013.01); *G06Q 10/0631* (2013.01)

(58) Field of Classification Search
  CPC .......... G06Q 10/067; G06Q 10/0631; G06Q 17/30893; G06Q 8/34; H04L 41/40; H04L 41/0823; G06F 8/34; G06F 17/30893; G06F 17/30864; G06F 17/3089; H04N 21/458
  See application file for complete search history.

(56) References Cited

U.S. PATENT DOCUMENTS

| 5,774,661 | A  | * | 6/1998 | Chatterjee | G06F 9/5038 |
| | | | | | 709/203 |
| 7,716,077 | B1 | * | 5/2010 | Mikurak | G06Q 10/06 |
| | | | | | 705/7.12 |
| 8,694,918 | B2 | * | 4/2014 | Mandelstein | G06Q 10/06 |
| | | | | | 715/810 |
| 8,856,737 | B2 | * | 10/2014 | Kand | G06F 8/71 |
| | | | | | 717/118 |
| 9,203,707 | B1 | * | 12/2015 | Hasija | H04L 41/50 |
| 9,350,561 | B1 | * | 5/2016 | Schafer | H04L 41/04 |

(Continued)

OTHER PUBLICATIONS

Non-Patent Literature; Drawings from U.S. Appl. No. 14/870,127, filed Sep. 30, 2015 to Jo S. Soo, et al., published as U.S. Patent Application Publication 2016/0216875 on Jul. 28, 2016.*

(Continued)

*Primary Examiner* — Tyler W Knox
(74) *Attorney, Agent, or Firm* — John W. Branch; Lowe Graham Jones PLLC

(57) ABSTRACT

Embodiments are directed towards managing online computer services to create custom business processes. A visualization model representing a business process may be provided. If the visualization model a modeling engine may produce a flow model from the visualization model. A flow model may be provided based on the visualization model, such that the flow model includes flow nodes and edges associating the flow nodes. A control model that is overlaid on the flow model may be provided, such that the control model may be arranged to share the flow nodes and the edges of the flow model. A data model that is overlaid on the flow model may be provided. The data model may be arranged to include one or more data model edges. The flow model may be provided to an executive engine that executes the flow model using one or more execution engines.

28 Claims, 26 Drawing Sheets

(56) References Cited

U.S. PATENT DOCUMENTS

| | | | |
|---|---|---|---|
| 2002/0138577 A1* | 9/2002 | Teng | G06F 21/41 709/205 |
| 2003/0071844 A1* | 4/2003 | Evans | G06F 8/34 715/763 |
| 2003/0153994 A1* | 8/2003 | Jin | G06Q 10/0633 700/99 |
| 2004/0027388 A1* | 2/2004 | Berg | G06Q 10/10 715/781 |
| 2004/0181775 A1* | 9/2004 | Anonsen | G06Q 10/06 717/104 |
| 2005/0066287 A1* | 3/2005 | Tattrie | G06F 9/451 715/769 |
| 2005/0066304 A1* | 3/2005 | Tattrie | G06F 8/30 717/101 |
| 2005/0096950 A1* | 5/2005 | Caplan | G06Q 10/06314 705/7.24 |
| 2006/0074730 A1* | 4/2006 | Shukla | G06Q 10/06 705/7.27 |
| 2006/0074735 A1* | 4/2006 | Shukla | G06F 8/34 705/80 |
| 2007/0087756 A1* | 4/2007 | Hoffberg | G06Q 10/0631 455/450 |
| 2007/0100959 A1* | 5/2007 | Eichstaedt | H04L 67/306 709/217 |
| 2009/0007056 A1* | 1/2009 | Prigge | G06Q 10/10 717/104 |
| 2009/0089078 A1* | 4/2009 | Bursey | H04W 4/70 705/300 |
| 2009/0177957 A1* | 7/2009 | Bouillet | G06F 8/30 715/230 |
| 2009/0222921 A1* | 9/2009 | Mukhopadhyay | G06F 8/30 726/23 |
| 2009/0249287 A1* | 10/2009 | Patrick | G06F 8/24 717/107 |
| 2009/0276753 A1* | 11/2009 | Bouillet | G06F 16/972 717/105 |
| 2010/0037157 A1* | 2/2010 | Chang | G06F 8/36 715/764 |
| 2010/0064277 A1* | 3/2010 | Baird | G06F 8/71 717/120 |
| 2010/0064357 A1* | 3/2010 | Baird | G06F 8/30 726/6 |
| 2010/0083212 A1* | 4/2010 | Fritzsche | G06F 8/34 717/104 |
| 2010/0125826 A1* | 5/2010 | Rice | G06F 16/9535 717/107 |
| 2011/0004565 A1* | 1/2011 | Stephenson | G06Q 10/06 705/348 |
| 2011/0029983 A1* | 2/2011 | Lu | G06Q 10/0631 718/105 |
| 2011/0093781 A1* | 4/2011 | Yaseen | G06Q 10/00 715/709 |
| 2011/0153368 A1* | 6/2011 | Pierre | G06Q 10/067 705/4 |
| 2011/0265060 A1* | 10/2011 | Fritzsche | G06F 8/10 717/104 |
| 2012/0198481 A1* | 8/2012 | Liang | G06F 8/38 719/328 |
| 2012/0303396 A1* | 11/2012 | Winkler | G06Q 10/00 705/7.11 |
| 2013/0073938 A1* | 3/2013 | Fernandes | G06Q 10/067 715/212 |
| 2013/0152041 A1* | 6/2013 | Hatfield | G06F 8/34 717/105 |
| 2013/0159081 A1* | 6/2013 | Shastry | G06Q 30/0274 705/14.23 |
| 2013/0205252 A1* | 8/2013 | Mandelstein | G06Q 10/06 715/810 |
| 2013/0212154 A1* | 8/2013 | Lehto | H04L 67/42 709/203 |
| 2014/0047351 A1* | 2/2014 | Cui | G06Q 10/06 715/744 |
| 2014/0188916 A1* | 7/2014 | Kieselbach | G06Q 10/0631 707/755 |
| 2014/0236881 A1* | 8/2014 | Meda | G06F 9/5077 706/47 |
| 2014/0237442 A1* | 8/2014 | Meda | G06Q 10/06 717/102 |
| 2015/0120701 A1* | 4/2015 | Schmidt | G06F 16/958 707/722 |
| 2015/0205602 A1* | 7/2015 | Prismon | G06F 8/71 717/121 |
| 2015/0339570 A1* | 11/2015 | Scheffler | G06N 3/10 706/16 |
| 2016/0044387 A1* | 2/2016 | Zucchetta | H04N 21/458 725/32 |
| 2016/0062737 A1* | 3/2016 | Stanfill | G06F 3/0482 717/105 |
| 2016/0063401 A1* | 3/2016 | Stachel | G06Q 10/067 705/7.23 |
| 2016/0196527 A1* | 7/2016 | Bose | G06Q 10/0832 705/332 |
| 2016/0216875 A1* | 7/2016 | Soo | G06F 3/0482 |
| 2016/0217406 A1* | 7/2016 | Najmi | G06Q 10/06315 |
| 2016/0366036 A1* | 12/2016 | Gupta | H04L 67/16 |
| 2017/0006135 A1* | 1/2017 | Siebel | H04L 67/02 |
| 2017/0052767 A1* | 2/2017 | Bennett | G06F 8/34 |
| 2018/0218295 A1* | 8/2018 | Hasija | G06Q 10/067 |

OTHER PUBLICATIONS

Non-Patent Literature, "Applied Cryptography, Second Edition: Protocols, Algorithms, and Source Code in C," Bruce Schneier, John Wiley & Sons, Inc., Jan. 1, 1996.*

Non-Patent Literature (NPL) Search of Google Patents, May 20, 2019.*

Non-Patent Literature (NPL) Search of Google Scholar, May 20, 2019.*

International Search Report and Written Opinion for Application No. PCTUS2016/015424 dated Apr. 29, 2016, 13 pages.

Braga, D.; Geri, S.; Daniel, F.; Martinenghi, D., "Mashing Up Search Services," Internet Computing, IEEE, vol. 12, No. 5, pp. 16, 23, Sep.-Oct. 2008.

Jin Yu; Benatallah, B.; Casati, F.; Daniel, F., "Understanding Mashup Development," in Internet Computing, IEEE, vol. 12, No. 5, pp. 44-52, Sep.-Oct. 2003.

M. Cameron Jones, Elizabeth F. Churchill, "Conversations in Developer Communities: A Preliminary Analysis of the Yahoo! Pipes Community", 2009, In Proceedings of the Fourth International Conference on Communities and Technologies, p. 195-204.

Cinzia Cappiello, Maristella Matera, Matteo Picozzi, Gabriele Sprega, Donato Barbagallo, Chiari Francalanci, "DashMash: A Mashup Environment for End User Development", 2011, Web Engineering: 11th International Conference, ICWE 2011, Paphos, Cyprus, Jun. 20-24, 2011, pp. 152-166.

Rosenberg, F.; Curbera, F.; Duftler, M.J.; Khalaf, R., "Composing RESTful Services and Collaborative Workflows: A Lightweight Approach," in Internet Computing, IEEE, vol. 12, No. 5, pp. 24-31, Sep.-Oct. 2008.

Mehmet Altinel, Paul Brown, Susan Cline, Rajesh Kartha, Eric Louie, Volker Marki, Louis Mau, Yip-hing Ng, David Simmen, Ashutosh Singh, "Damia—A Data Mashup Fabric for Intranet Applications", VLDB 2007, Sep. 23-28, 2007, ACM, p. 1370-1373.

Maximilien, E.M.; Ranabahu, A.; Gomadam, K., "An Online Platform for Web APIs and Service Mashups," in Internet Computing, IEEE, vol. 12, No. 5, pp. 32-43, Sep.-Oct 2008.

Office Communication for U.S. Appl. No. 14/953,821 dated Feb. 5, 2016, 16 pages.

Office Communication for U.S. Appl. No. 14/633,003 dated Jun. 18, 2015, 14 pages.

Office Communication for U.S. Appl. No. 14/633,003 dated Oct. 16, 2015, 9 pages.

Office Communication for U.S. Appl. No. 14/953,821 dated Aug. 24, 2016, 6 pages.

(56) References Cited

OTHER PUBLICATIONS

Office Communication for U.S. Appl. No, 14/953,821 dated Jun. 1, 2016, 17 pages.

* cited by examiner

ENGINE FOR MODELING AND EXECUTING CUSTOM BUSINESS PROCESSES

TECHNICAL FIELD

This invention relates generally to integrating business processes and more particularly, to modeling and executing custom business processes.

BACKGROUND

Organizations are relying more and more on disparate processes that may be provided by an increasing number of internal or external service providers. Various service providers may provide services for communication, event monitoring, contact management, sales process management, or the like. Many of these services may be accessible over a network and/or hosted in a cloud computing environment. Also, members of an organization may access services from remote locations. Further, the ubiquity of the Internet and cloud-based environments has given rise to many services and/or applications that may be easily employed by an organization. In some cases, organizations may desire to create business processes based on two or more disparate services. Unfortunately, in some cases, differences between the interfaces and schemas of the available services may discourage organizations from taking advantage of generating processes that integrate separate services. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
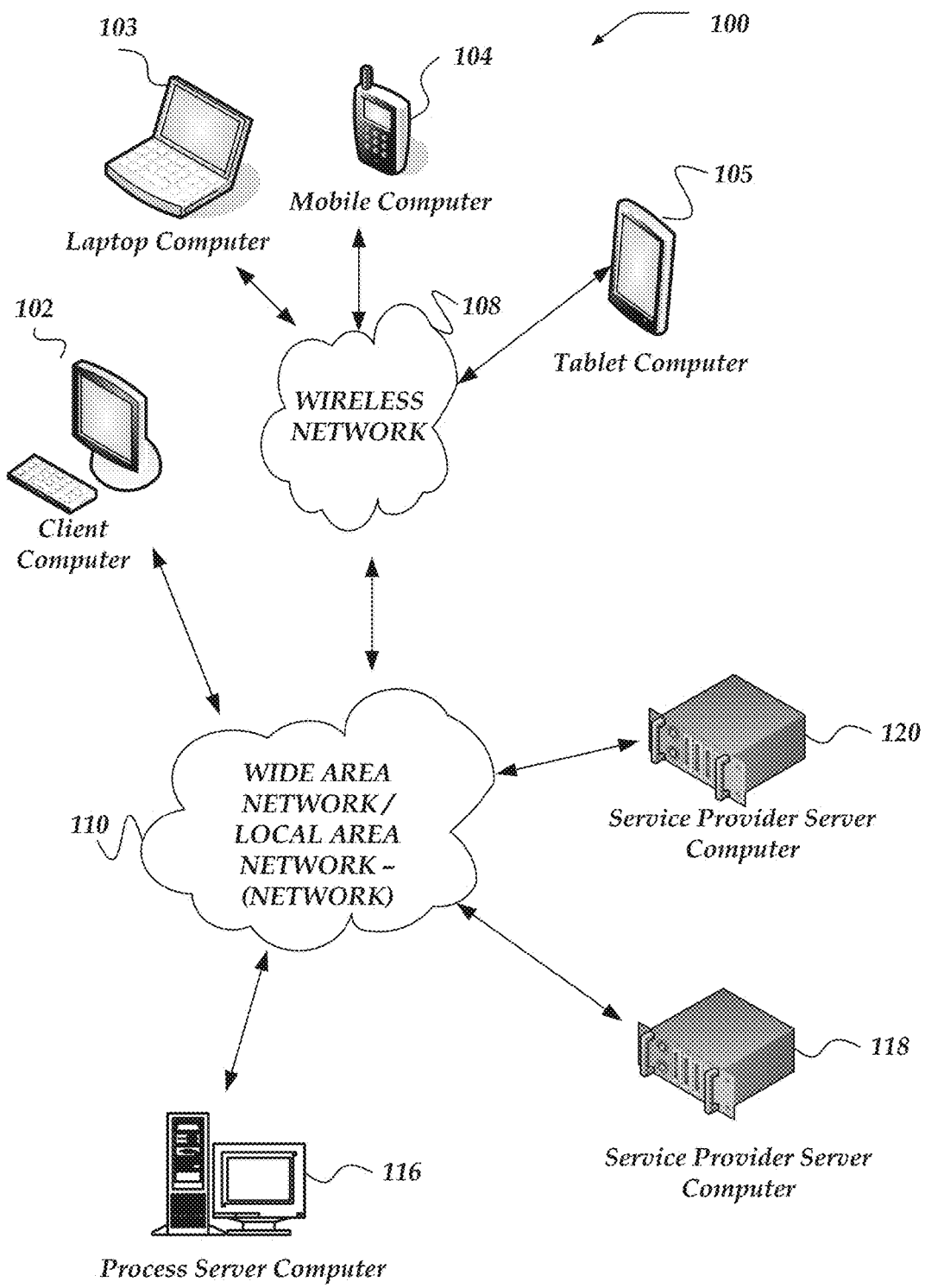
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "service," and "service provider," refer to a computer provided service that may be accessed by another computer and/or service. A service provider may be an internal or external entity that provides one or more services. Services may be software-as-a-service (SaaS) systems, application service provides (ASP), platforms-as-a-service (PaaS), or the like, or combination thereof. Services may be hosted on internal or external networks, including public, private, or hybrid cloud based environments. Example services may include, email, message broadcasting, social networks, system logs, customer relationship management (CRM) applications, search engines, software source control systems, customer support systems, defect/bug tracking systems, or the like.

As used herein the term "flow" refers generally to a multiple step process that may be comprised of one or more selected services. One or more events or message streams from the selected services may enter and be processed by the flow.

As used herein the terms "service channel," and "channel" refer to each service included in a flow. Each service may be represented by a service channel flow node. Service channels represent one or more particular interfaces to a service. In some cases, a service may operate in different modes and/or offer different interfaces for performing different actions, accordingly, each mode and/or interface may be represented as a separate service channel. Each service channel may have a specialized collection of configuration information, including channel flows, that may be used to establish the correspondent service interface.

As used herein the term "service connector" refers to an interface component that is arranged to interface with a given service. Service channels may be arranged to rely on particular service connectors to communicate or connect with services. In some cases, some execution engines or task queues may be associated with one or more service connectors.

As used herein the term "channel configuration value," and "configuration field" refer to fields for holding configuration information for a particular service channel. In some cases, configuration information may include information for authorizing the flow to access a service. In other cases, configuration information may include hints, filters, rules, or the like, for determining relevant events for a particular service channel.

As used herein the term "flow field" refers to fields that represent the inputs and/or outputs of a flow node. The availability of a given field, its name, type, purpose, and so on, depend on the particular flow node. In some embodiments, some flow fields may be arranged to be unidirectional while other flow fields may be multi-directional. In at least one of the various embodiments, flow fields arranged to receive information may be described as input flow fields. Likewise, flow fields arranged to provide information from a flow node may be described as output flow fields.

As used herein the term "channel flow" refers to a flow designed to perform configuration integration with a service channel. In at least one of the various embodiments, each individual service channel may have a corresponding channel flow that supports is particular configuration and/or integration requirements. In at least one of the various embodiments, the channel flow (described in more detail below) may include flow nodes that collect configuration information used during flow design and operation. Such information may include, meta-data sources, authorization method information, field information, or the like.

As used herein the term "flow model" refers to data structure arranged to represent a flow. Flow models may be comprised of one or more flow state nodes that represent a state of a given flow. Nodes in the flow model may be interconnected based on one or more relationships of their actions and/or one or more relationships of their data. Flow models may be comprised of a control model and a data model that may share the same flow state nodes. (See, below.)

In some embodiments, flow states may be represented as nodes with the relationships and/or data flow between nodes represented as edges. In at least one of the various embodiments, a flow model may be represented by a directed acyclic graph but that is not a requirement for an operative flow model. In at least one of the various embodiments, a flow model graph may contain cycles that may be resolved or estimated using mathematical techniques, including but not limited to Gaussian elimination, Cholesky decomposition or Newton's method. Also, other graph related techniques, such as, bisection may be performed to identify one or more portions of flow model that may be executed independently and/or concurrently.

In at least one of the various embodiments, flow models may be arranged to be stored in a self-referential database such that some or all of the flow nodes for a flow model may be stored in the same database table. Accordingly, different records in the table may be arranged to include references to other records in the same table that also represent flow nodes for a flow model. Accordingly, in some embodiments, the graph structure of a flow model may be represented in a single table rather than requiring normalized database tables. Accordingly, in some embodiments, the flow models may be traversed by scanning through a single table rather than having to execute slower performing database query joins, or the like.

As used herein the term "control model," or "flow control model" refers to data structure arranged to represent relationships and/or transitions between flow nodes comprising a flow model. Control models may be considered part of a flow model. Control models may be considered to overlaid on a flow model such that the flow state nodes of the flow model are nodes in the control model.

As used herein the term "data model," or "flow data model" refers to a data structure arranged to represent how data in a flow model may move through a flow model. Edges in a data model may correspond to data transformations that may occur in flow model. Some data model edges may be considered separate and/or distinct from one or more edges in an associated control model. Data models may be considered to overlaid on a flow model such that the flow state nodes of the flow model are nodes in the data model.

As used herein the term "visualization model" refers to a data structure and/or user-interface features used to present a flow model to a user. Visualization models may be based on an underlying flow model. In some cases, an underlying flow model may be created based on a visualization model that may be provided by a user.

As used herein the term "channel flow model" refers to a flow model that model the operations required to interact with a given service. Accordingly, service channels or service connectors may be associated with an underlying channel flow model. Channel flow models may be comprised of a control model, data model, visualization, or the like, just the same as other flow models. However, in some cases, the details of the channel flow model may be hidden from users. For example, nodes in a flow model that correspond to a service channel may represent an entire underlying channel flow model.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing online computer services to create custom business processes. In one or more of the various embodiments, a visualization model representing a business process may be provided. In some embodiments, the visualization model may include a plurality of card user-interfaces.

In one or more of the various embodiments, if the visualization model may be provided to a modeling engine, the modeling engine may be arranged to perform addition actions to produce one or more flow models from the visualization model.

In one or more of the various embodiments, a flow model may be provided based on the visualization model, such that the flow model includes two or more flow nodes and one or more edges associating the one or more flow nodes. In one or more of the various embodiments, providing the flow model based on the visualization model, may include providing one or more section attributes based on section information included in the visualization model and associating the one or more section attributes with one or more of the one or more flow nodes based on the section information.

In one or more of the various embodiments, a control model that is overlaid on the flow model may be provided, such that the control model may be arranged to share one or more flow nodes and the one or more edges of the flow model.

In one or more of the various embodiments, a data model that is overlaid on the flow model may be provided. The data model may be arranged to include one or more data model edges, Also, in some embodiments, the data model may be arranged to shares one or more flow nodes of the flow model.

In one or more of the various embodiments, one or more data transformation rules may be associated with one or more of the data model edges, such that the one or more data edges are associated with a flow node that produces data and another flow node that consumes data.

In one or more of the various embodiments, a memory may be configured and arranged to store the flow model, the data model, the control model, or the like.

In one or more of the various embodiments, the flow model may be provided to an executive engine that executes the flow model using one or more execution engines.

In one or more of the various embodiments, field type information may be associated with one or more fields of one or more of the plurality of card user-interfaces. And, in some embodiments, the modeling engine may be employed to modify the data model to include data transformation rules that correspond to the field type information.

In one or more of the various embodiments, field types may be considered to contemplate various kinds of meta-data that may be associated with a field.

In one or more of the various embodiments, the modeling engine may be arranged to traverse the visualization model to select one or more visualization model nodes that may be associated with the plurality of card user-interfaces. And, in some embodiments, the modeling engine may be arranged to transform the one or more visualization model nodes into the one or more flow nodes.

In one or more of the various embodiments, the modeling engine may be arranged to modify the control model by associating one or more retry policies with the one or more flow nodes, such that the one or more retry policies may define a maximum number of automatic retries for one or more flow tasks that may be associated with the one or more flow nodes.

In one or more of the various embodiments, the modeling engine may be arranged to modify the control model by associating one or more error handling flow models with the one or more flow nodes, such that the one or more error handling flow models define a separate process for handling one or more discovered errors.

In one or more of the various embodiments, if the visualization model references one or more embedded flow models, the one or more embedded flow models may be associated with the flow model, such that the one or more embedded flow models may be linked to one or more of the one or more flow nodes.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Process Server Computer 116, one or more services provided by servers, such as, Service Provider Server Computer 118, Service Provider Server Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, process server computer 116, service provider server computer 118 and service provider server computer 120, or other computers.

Client computers 102-105 may further be configured to include a client application that enables an end-user to log into an end-user account that may be managed by another computer, such as process server computer 116, service provider server computer 118, service provider server computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to process server computer 116. Also, client computers may be arranged to enable users to display reports, interactive user-interfaces, and/or results provided by process server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, process server computer 116, service provider server computer 118, service provider server computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of process server computer 116 is described in more detail below in conjunction with FIG. 3. Briefly, however, process server computer 116 includes virtually any network computer capable of service integration in network environment.

Although FIG. 1 illustrates process server computer 116, service provider server computer 118, and service provider server computer 120, each as a single computer, the innovations and/or embodiments are not so limited. For example, one or more functions of process server computer 116, and service provider server computer 118, and service provider server computer 120, or the like, may be distributed across one or more distinct network computers. Moreover, process server computer 116, and service provider server computer 118, and service provider server computer 120, are not limited to a particular configuration such as the one shown in FIG. 1. Thus, in one embodiment, process server computer 116, and service provider server computer 118, and service provider server computer 120 may be implemented using a plurality of network computers. In other embodiments, server computers may be implemented using a plurality of network computers in a cluster architecture, a peer-to-peer architecture, or the like. Further, in at least one of the various embodiments, process server computer 116, and service provider server computer 118, and service provider server computer 120 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
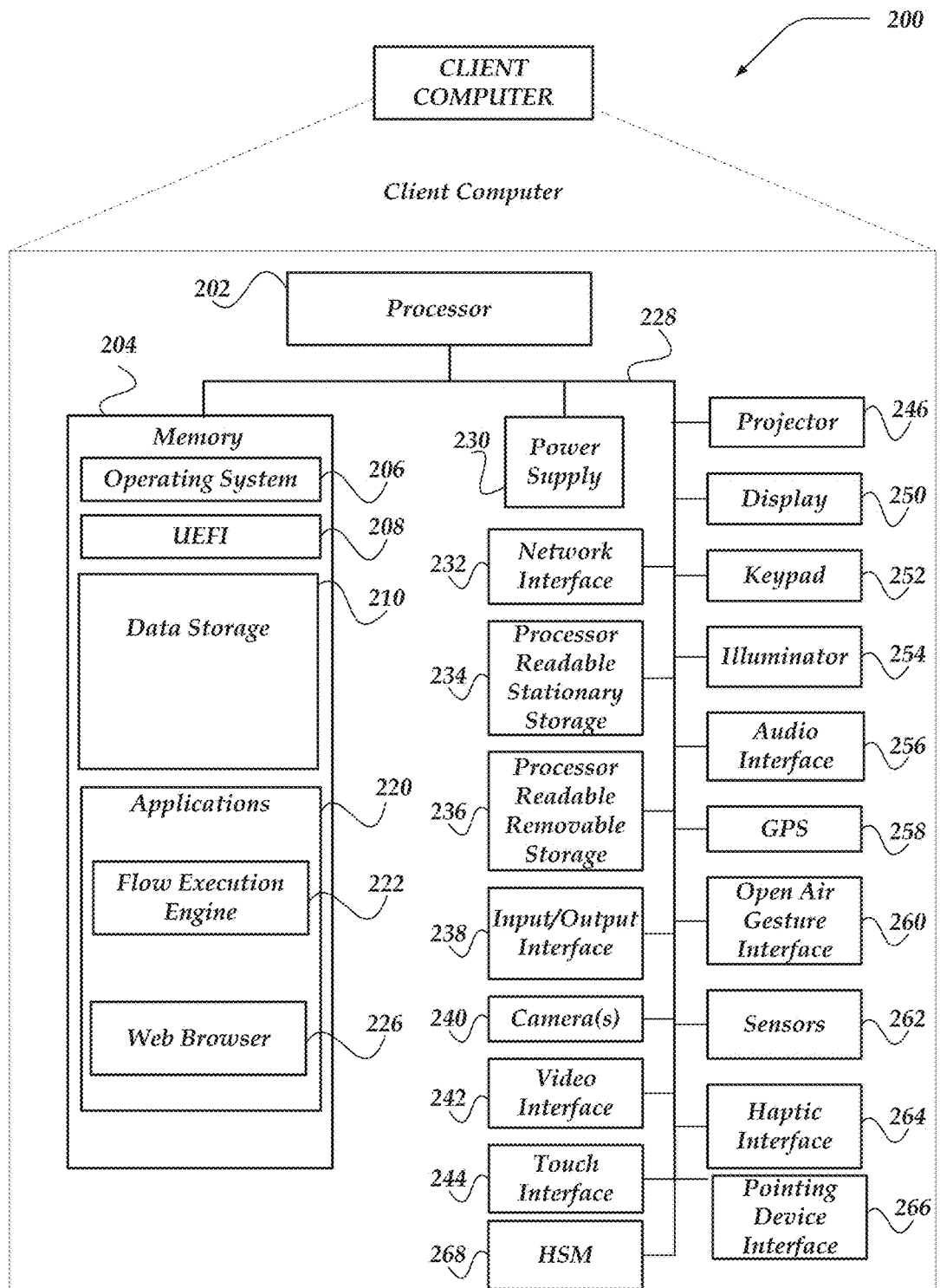
FIG. 2 shows a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, flow execution engine 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, flow execution engine 222. In at least one of the various embodiments, flow execution engine 222 may be used to execute one or more portions of application flows.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
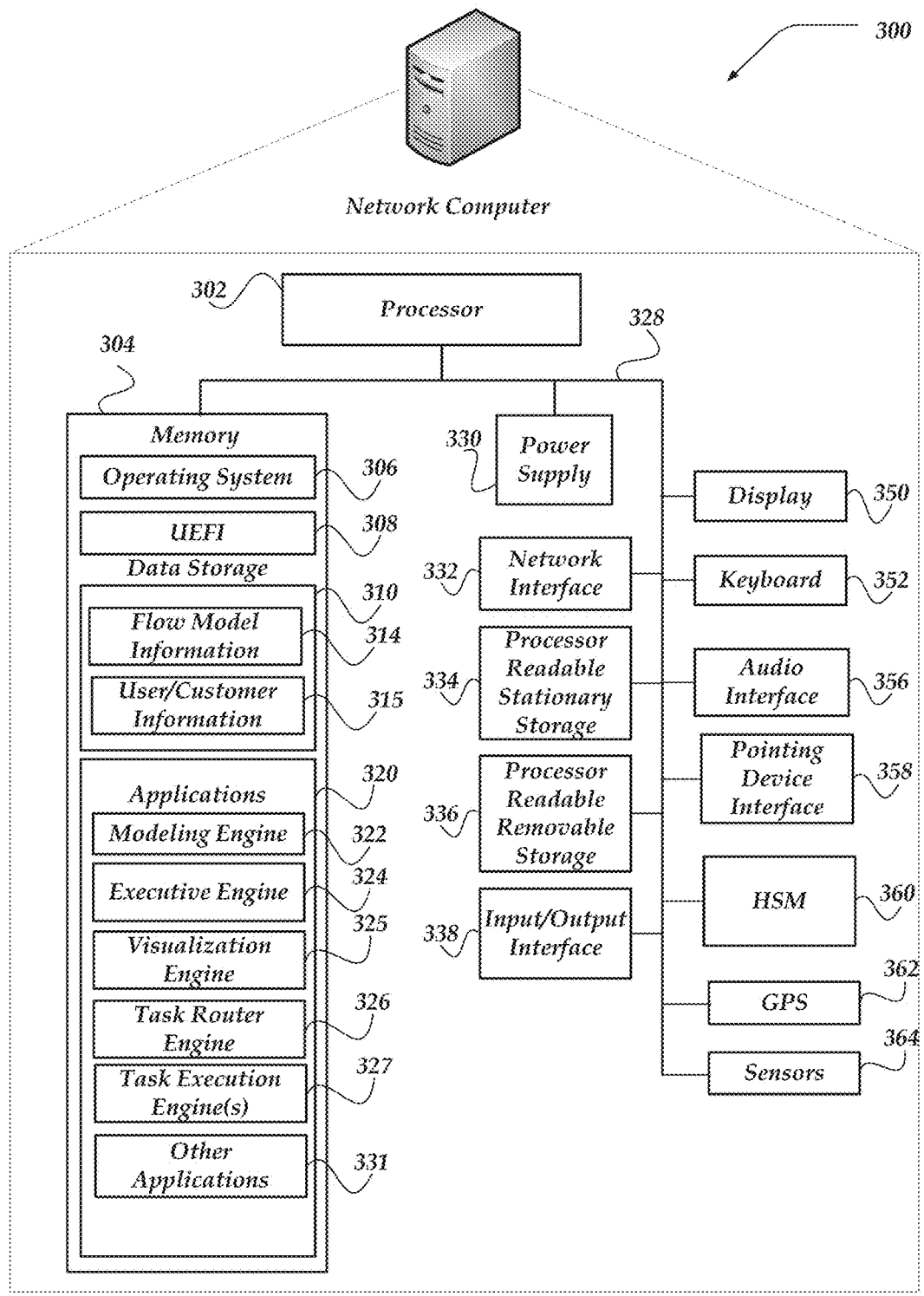
FIG. 3 illustrates a schematic embodiment of a network computer.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of process server computer 116, service provider server computer 118, or service provider service computer 120 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, process flow model information 314, user/customer information 315, or the like.

Flow model information 314 may include information and/or data the configures/defines/describes one or more flow models, including control models and data models. User/customer information 315 may include information that may be associated with users or customers and may be used during the design, configurations, or execution of their flows.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, flow executive engine 324, visualization engine 325, task router engine 326, task execution engine 327, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, modeling engine 322, flow executive engine 324, visualization engine 325, task router engine 326, task execution engine 327, other applications 331, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geo-location protocols over the networks, such as, wireless network 108 and/or network 111.

Furthermore, in at least one of the various embodiments, modeling engine 322, flow executive engine 324, visualization engine 325, task router engine 326, task execution engine 327, or other applications 331, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to modeling engine 322, flow executive engine 324, visualization engine 325, task router engine 326, task execution engine 327, or other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

In at least one of the various embodiments modeling engine 322, flow executive engine 324, visualization engine 325, task router engine 326, or task execution engine 327, may enable a user to generate application flows, flow channels, flow cards, control flow models, data flow models, reports, what-if-analysis, or the like. Also in at least one of the various embodiments, modeling engine 322, flow executive engine 324, visualization engine 325, task router engine 326, or task execution engine 327, may employ processes, or parts of processes, similar to those described below.

Illustrative Logical System Architecture

Figure 4:
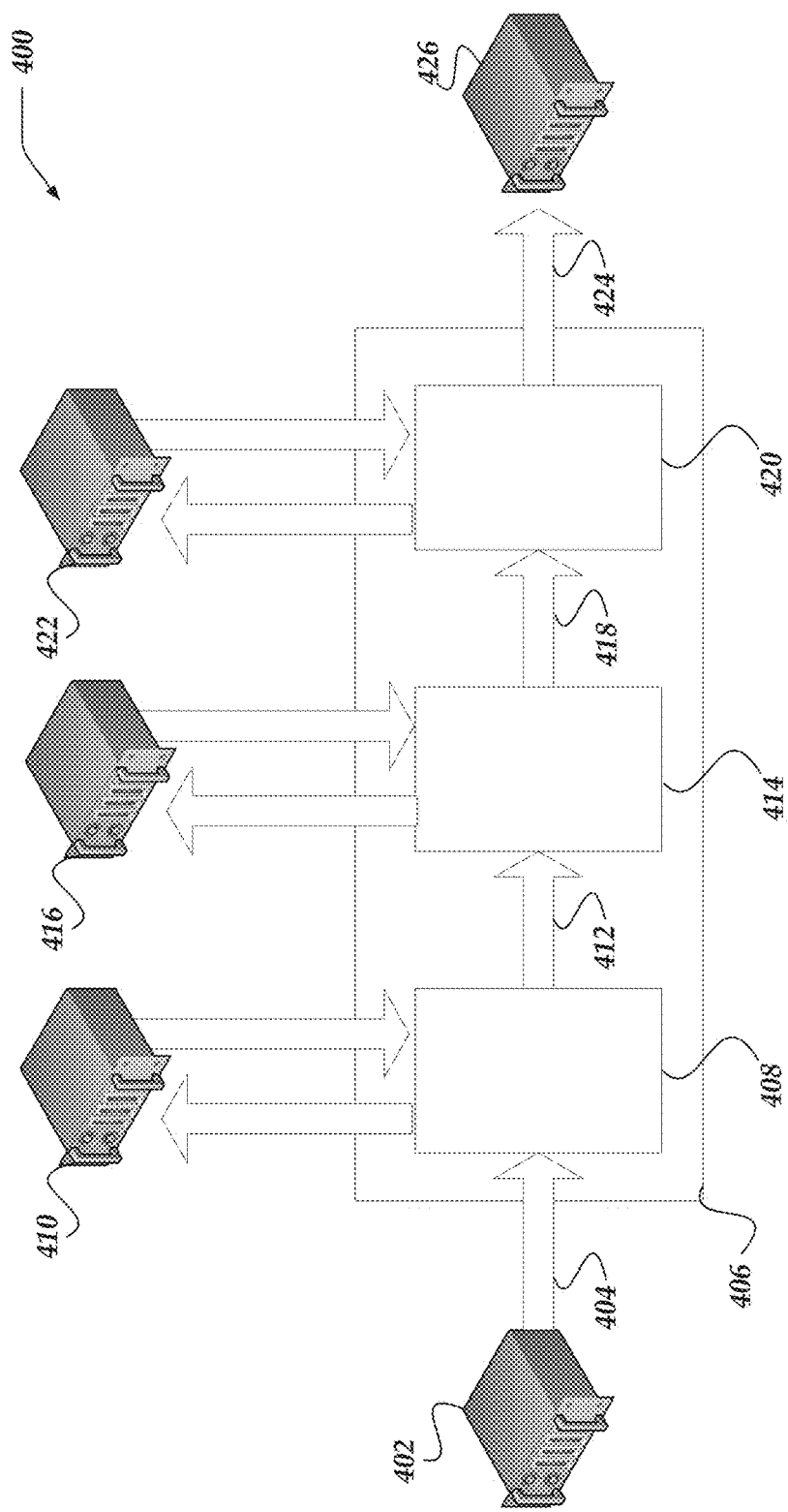
FIG. 4 shows a logical schematic of a portion of a flow execution system in accordance with at least one of the various embodiments.

FIG. 4 shows a logical schematic of a portion of flow execution system 400 in accordance with at least one of the various embodiments. Briefly, in at least one of the various embodiments, system 400 may illustrate a flow comprised of three different services.

In at least one of the various embodiments, service provider 402 may provide information such as various kinds of events over a communication path, such as communication path 404. The communication from service provider may be provided to process flow 406. Accordingly, in at least one of the various embodiments, process flow application 406 may provide the information from service provider 402 to a flow representing a business process. In at least one of the various embodiments, process flows may be comprised of one or more service channels, such as, service channel 408, service channel 412, and service channel 422. In some embodiments, flows may be arranged to have a defined sequence such that the service channels may be accessed in a particular order (if at all). Accordingly, in this example, service 408 may receive the information from service provider 402. In other embodiments, one or more service channels may be arranged to receive information concurrently (e.g., in parallel).

In at least one of the various embodiments, service channel 408 may be arranged to generate result information based on some or all of the information from service provider 402. In some embodiments, the information may be provided to another service provider such as service provider 410. Accordingly, in at least one of the various embodiments, service provider 410 may generate the result information and provide it back to the service channel. Also, service provider 410 may generate information that may be further processed by service channel 408 before it may be presented as result information. For example, a service channel may receive an event and provide a portion of the event to a service provider for processing and then provide the processed event information to another service channel.

In at least one of the various embodiments, if process flow 406 includes more than one service channel, the next service channel in the flow may be provided the results from one or more previous service channels. In this example, service channel 408 communicates some or all its result information over communication path 412 to service channel 414. Likewise, in some embodiments, service channel 414 may be arranged to provide some or all of the information communicated from service channel 408 to service provider 416. The substantially same actions described may be performed for each service channel in the flow. Thus, in this example, information from service channel 414 may be provided over communication path 418 to service channel 420 and then to service provider 422, and so on.

In at least one of the various embodiments, each flow may have an endpoint service provider that is provided information from one or more of the service channels in the flow. In this example, service provider 426 may be considered the endpoint service provider. Accordingly, result information from service channel 420 may be provided to service provider 426 over communication path 424.

Further, in at least one of the various embodiments, although process flow application 406 is illustrated as a sequential and/or synchronous flow process, starting at service channel 408 and ending and service channel 420, other flow process applications may be arranged to include one or more asynchronous events. For example, in at least one of the various embodiments, a service channel may asynchronously communicate to a service provider. Accordingly, in this example, if the service provider later communicates a response, it may be provided to the service channel. Also, in at least one of the various embodiments, service channels that may be waiting for a response from a service provider may be marked and/or tagged as being in wait state.

In at least one of the various embodiments, flows may be arranged to include one or more service channels that may operate in parallel as well as asynchronously. Also, in at least one of the various embodiments, a flow process application may be arranged such one or more service channels may block the progress of the process until they have fully processed the event. For example, a service channel may be configured to block the operation of a flow while it is waiting for a service provided to respond to communication.

Figure 5:
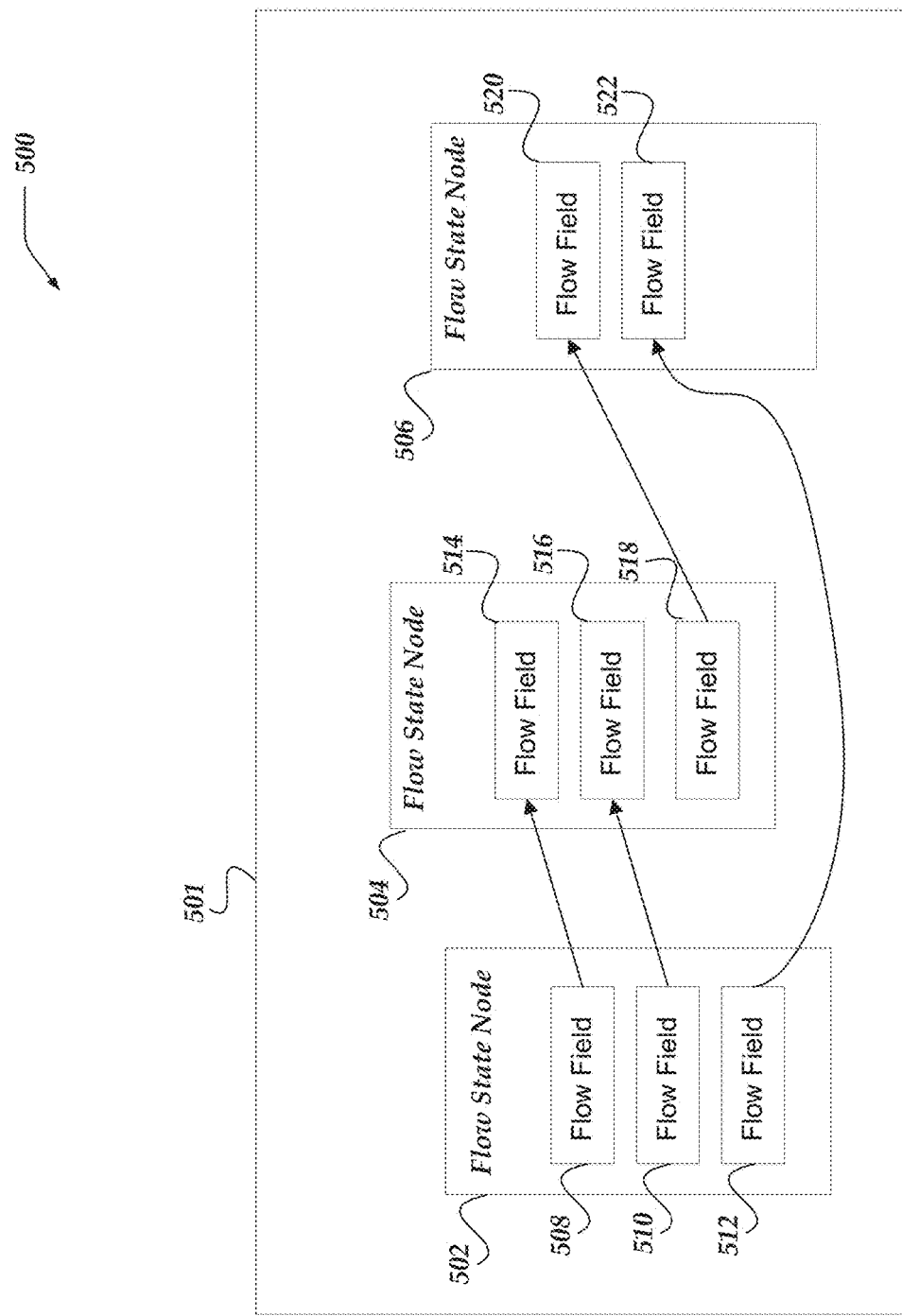
FIG. 5 shows a logical representation of a portion of a flow visualization in accordance with at least one of the various embodiments.

FIG. 5 shows a logical representation of a portion of flow visualization 500 in accordance with at least one of the various embodiments. In at least one of the various embodiments, if service channels have been added to a flow and configured, the flow fields from one service channel may be mapped to flow fields for one or more other service channels. In at least one of the various embodiments, node 502, node 504 and node 506 represent visualizations of flow state node that may be part of flow 501.

In at least one of the various embodiments, a flow designer application may be arranged to enable user manipulate a visualization model of a flow by mapping the flow fields from one flow state node to another. In at least one of the various embodiments, each flow state node may display one or more flow fields. Flow fields may be labeled with a name relevant to service channel they are associated with. In some embodiments, the label of the flow field may be defined by a user as part of configuring the service channel. In FIG. 5, for brevity and clarity the flow fields are illustrated using the label "Flow Field". However, in at least one of the various embodiments, in practice flow fields may have labels such as, name, id, URL, subject, contents, description, suite number, address, or the like. In at least one of the various embodiments, the labels may correspond with fields/properties of the underlying service channel interface. In some embodiments, the flow designer application may be arranged to execute one or more channel flows to provide query meta-data information from the service providers to determine which flow fields are available for configuration and/or mapping.

In one or more of the various embodiments, a modeling engine may be arranged to user unique identifiers for fields, flow nodes, data model nodes, or the like, that are separate from the user friendly labels. Accordingly, in one or more of the various embodiments, the flow modes, model nodes, data nodes, service channels, or the like, may be renamed without disrupting the data organization of the system.

Further, in at least one of the various embodiments, flow fields may represent outputs (sources) or inputs (sinks) of the service depending on the underlying service and its interface. Also, in at least one of the various embodiments, a service provider may offer more than one service channel that may have different interfaces, such as, as service channel interface for receiving/retrieving events/information and a different interface for sending/generating events/information. In some embodiments, a service channel may include input and output flow fields in the same interface.

In the example shown in FIG. 5, node 502 includes flow field 508, flow field 510, and flow field 512. Node 504, includes flow field 514, flow field 516, and flow field 518. And, node 506 includes flow field 520 and flow field 522. Continuing with this example, flow 500 includes flow fields mapped from node 502 to flow fields in node 504 and node 506. And, flow fields from node 504 mapped to node 506. As illustrated by this example, flow fields may be selectively mapped. And, flow fields may "skip" a node as shown here. (Flow field 512 is mapped to flow field 522 skipping flow state node 504).

In at least one of the various embodiments, flow fields from one node may be mapped to two or more nodes. Also, there is no general requirement to map each flow field. In at least one of the various embodiments, the flow fields may be selected for mapping based on the design intentions of the user and/or requirements of flow state nodes included in the flow.

Also, in one or more of the various embodiments, the flow designer may be arranged to enable a user to override the default field type of a flow node. Accordingly, in one or more of the various embodiments, inputs or outputs may be coerced to a field type that is selected during the design of the flow.

Figure 6:
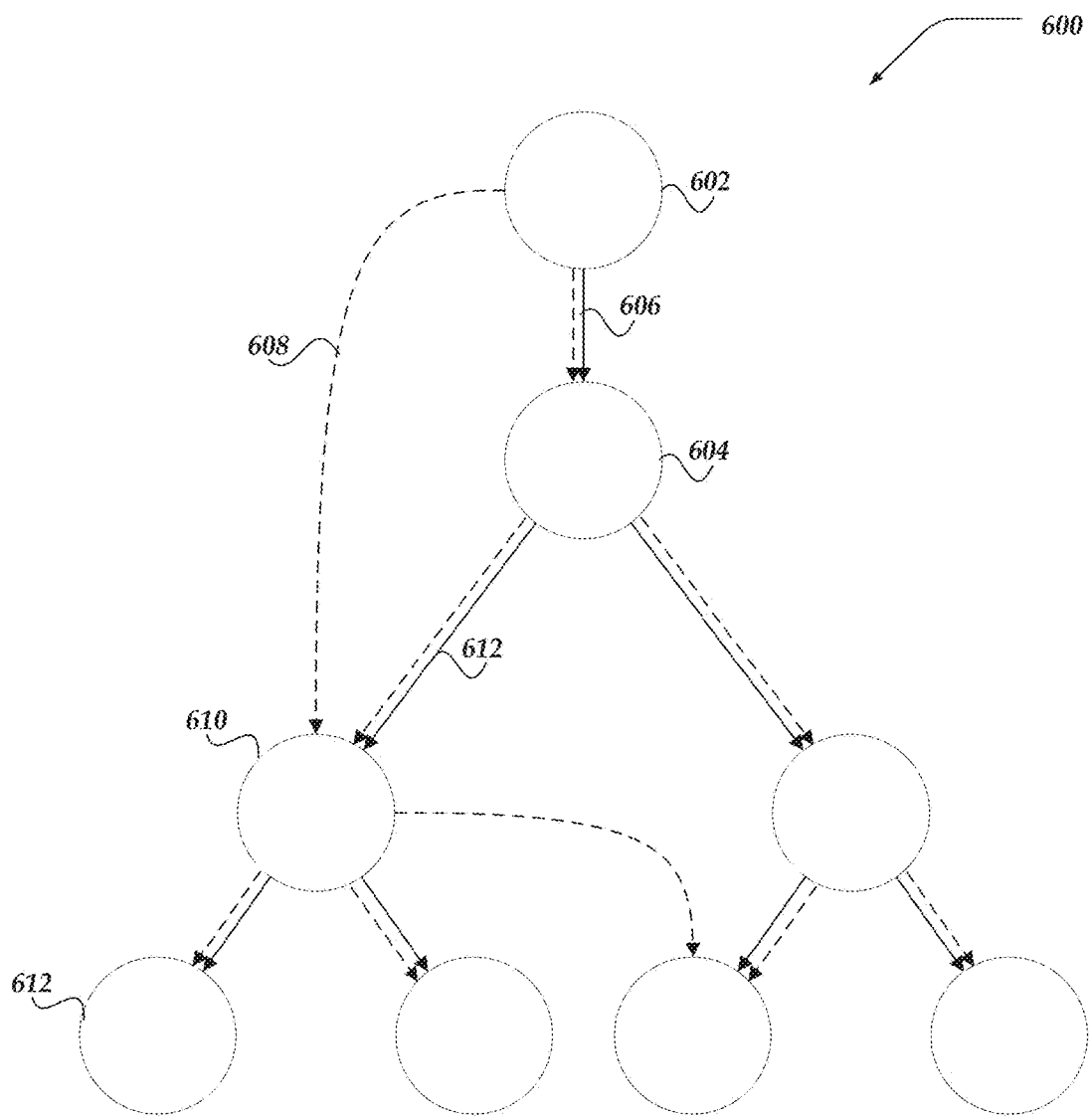
FIG. 6 illustrate a logical representation of a flow model in accordance with at least one of the various embodiments.

FIG. 6 illustrate a logical representation of flow model 600 in accordance with at least one of the various embodiments. In at least one of the various embodiments, flows, such as flow 500 may be visualization models based on underlying flow models. Flow models may define the various flow states and their relationship to each other.

In at least one of the various embodiments, flow model 600 includes a plurality of flow nodes, such as node 602, node 604, and node 610. In at least one of the various embodiments, one or more of the nodes in flow 600 may correspond to visualizations of flow nodes, such as those illustrated in FIG. 5. Likewise, in some embodiments, one or more flow nodes may be omitted from visualization models and/or displays.

In at least one of the various embodiments, flow models may be comprised of a control model and a data model. Control models and data models may be overlaid over the same flow nodes of the same flow model. Accordingly, in some embodiments, the control model and data model may be arranged to share the flow nodes. Control models may be arranged to represent the flow of actions through a flow. As one flow node tasks are completed the control model determines the next flow node. In some embodiments, edges in a control model may represent state transitions that may occur in the flow model. In this example, control edges are shown using solid directed lines.

Also, in some embodiments, edges for a data model may represent how data may flow through a flow. In this example, data model edges are represented using dashed directed lines. Likewise, in some embodiments, data model edges may also be associated with one or more data transformations, data validations, or the like, or combination thereof, defined using data transformation rules that may be applied to data moving through the flow model. Accordingly, transitions in the data model describe how data may flow through the flow model separate from how state or control flows through the flow model.

In some cases, the control model and data model may have the same topology such that they may appear to share the same edges. However, internally the two models may be arranged to maintain separate control edges and data edges. Indicated here by control edges being the solid directed lines and data model edges as being dashed directed lines.

In this example, for some embodiments, node 602 may be connected to node 604. In this example, edge 606 may represent both a control edge for the control model and the data edge for the data model. Likewise, for some embodiments, node 604 may be connected to node 610 via edge 612. Edge 612 may represent a control model edge and a data edge, depending how model 600 may be arranged.

In this example, for some embodiments, edge 608 may represent an explicit data model edge. In this example, edge 608 may represent data provided by node 602 that may be provided directly to node 610 rather than first going through node 604.

In at least one of the various embodiments, each flow node may be arranged to encapsulate the properties, behaviors, types, authentication rules, or the like, that may be associated with performing one or more actions associated with the node.

In at least one of the various embodiments, an executive engine may be arranged to traverse one or more flow models to select one or more flow nodes that may be processed. In some embodiments, one or more flow tasks may be comprised based on a flow node and its associated data.

In one or more of the various embodiments, each node in flow 600 may reference or represent another flow model. In one or more of the various embodiments, if a node in a flow model references another flow model, the reference flow model may be expanded and executed at runtime.

Figure 7:
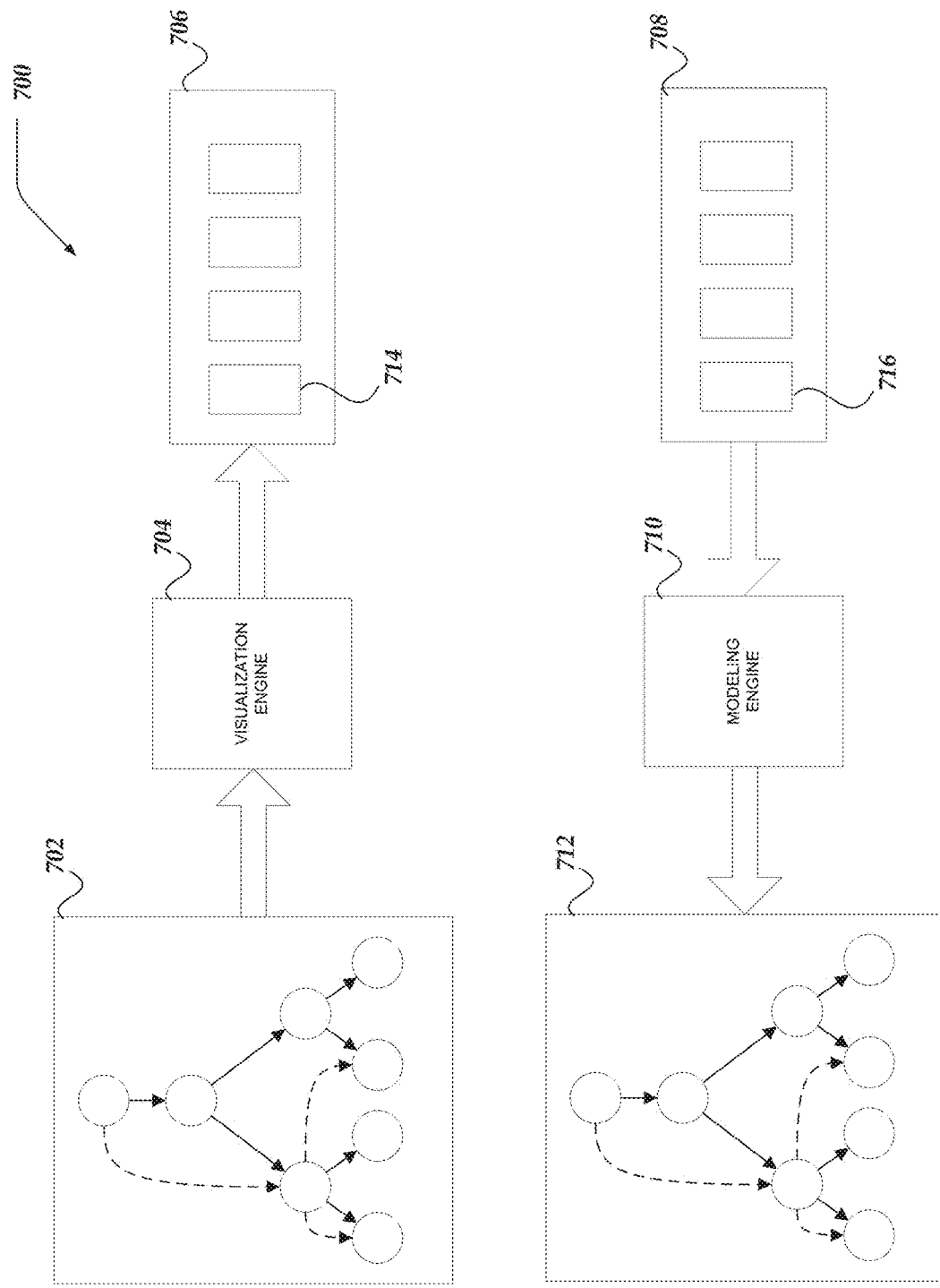
FIG. 7 illustrates a portion of a logical architecture of a modeling system showing transformation of flow models in accordance with at least one of the various embodiments.

FIG. 7 illustrates a portion of logical architecture of modeling system 700 showing transformation of flow models in accordance with at least one of the various embodiments. In at least one of the various embodiments, flow model 702 may be processed by a visualization engine, such as, visualization engine 704. In some embodiments, visualization engine 704 may be a visualization engine, such as, visualization engine 325.

In at least one of the various embodiments, visualization engine 704 may be arranged to transform one or more flow models, such as flow model 702 into a visualization model, such as, visualization model 706 that may be used to display and/or interact with a flow. In some embodiments, visualization engine 704 may be arranged to compile flow models into visualization models similar flow model 500. Accordingly, in some embodiments, visualization engine 704 may be arranged to traverse flow models, such as flow model 702 to generate a user-interface that corresponds with the flow model. In this example, visualization engine 704 may be arranged compile one or more of the flow nodes of flow model 702 in one or more visual flow nodes, illustrated here by visual flow node 714.

Also, in at least one of the various embodiments, a user may employ a flow designer application to build flows by building visualization models. Accordingly, in some embodiments, visualization model 708 may be transformed by a modeling engine, such as modeling engine 710 into flow model 712. In some embodiments, visual flow nodes, such as visual node 716 may be transformed into one or more flow nodes of flow model 712.

In one or more of the various embodiments, the visualization model may be arranged to include field type information, access/security rules, flow sections, flow groups, retry policies, error handling flows, collection handling rules, service channel credentials, or the like, or combination thereof. Accordingly, in some embodiments, the modeling engine may be arranged compile field type information, access/security rules, flow sections, flow groups, retry policies, error handling flows, collection handling rules, service channel credentials, or the like, into the flow model.

In at least one of the various embodiments, a modeling engine may be arranged to provide one or more interfaces that enable some users to create, view, or edit, flow models directly. In some embodiments, these interfaces may include, command line interfaces, graphical user interfaces, local APIs, remote APIs, or the like, or combination thereof.

Figure 8:
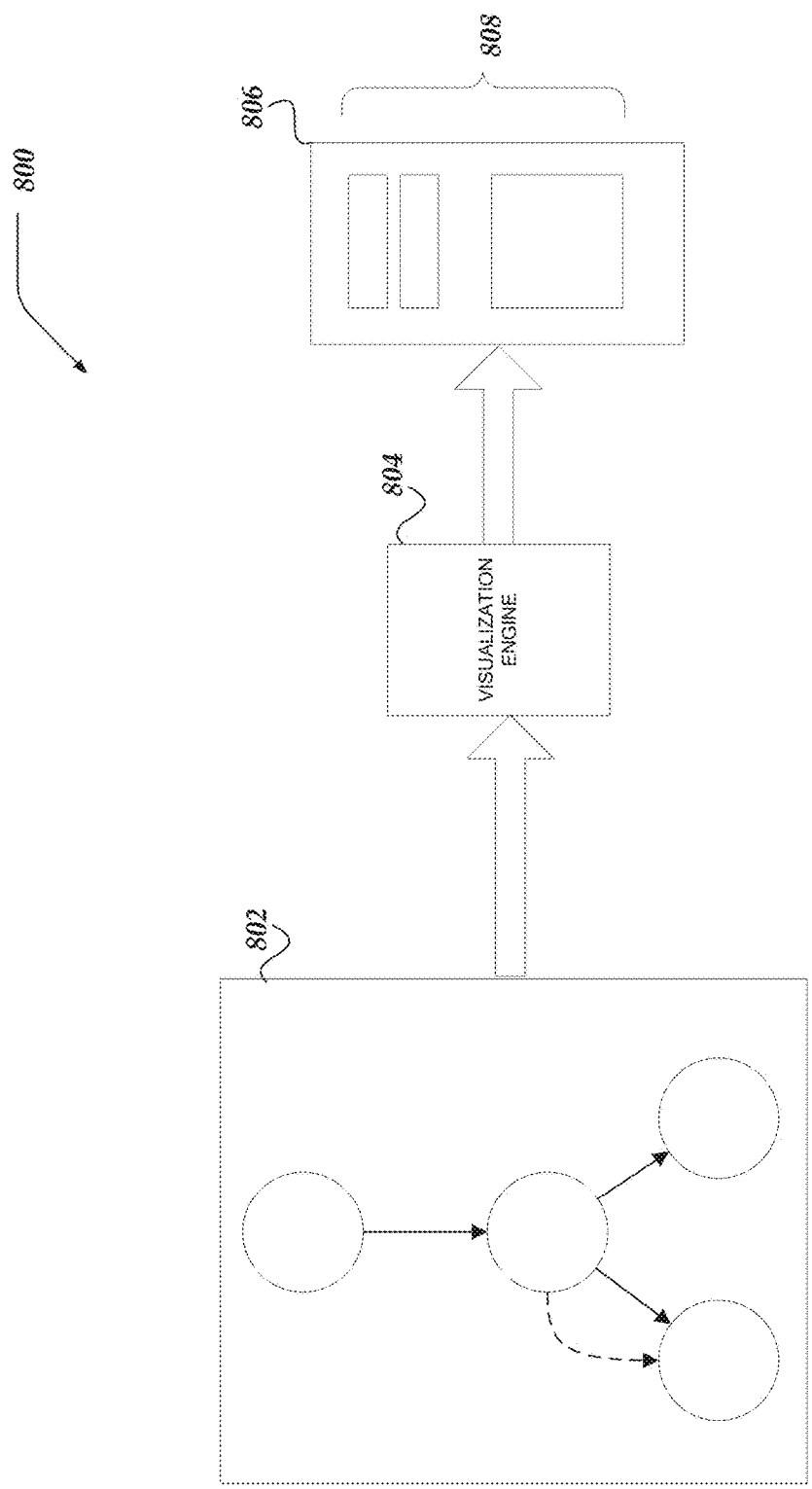
FIG. 8 illustrates a portion of a logical architecture for a system for providing service channel nodes in accordance with at least one of the various embodiments.

FIG. 8 illustrates a portion of a logical architecture for system 800 for providing service channel nodes in accordance with at least one of the various embodiments. In at least one of the various embodiments, channel flows may be a variation of flows and flow models arranged to model and perform one or more actions that may be associated with integrating flows with service providers via service channels.

In at least one of the various embodiments, channel flows may be comprised of a channel flow model, such as, channel flow model 802. In some embodiments, channel flow models may be arranged to model and perform one or more actions for obtaining integration information from a service provider. In at least one of the various embodiments, channel flow model 802 may be arranged to represent actions for discovering features/properties that may be associated with the service channel. For example, for some embodiments, this may include discovering meta-data, field types, schema information, authentication/security requirements, behaviors, input fields, output fields, required inputs, default values for inputs, or the like, or combination thereof.

In at least one of the various embodiments, each service provider may have one or more unique properties that may influence how the service channel may be integrated into a flow. Accordingly, in at least one of the various embodiments, visualization engines, such as visualization engine 804 may be arranged to transform channel flow models into visualization models 806 that enable users to integrate service channels into flows. For example, in at least one of the various embodiments, channel flows may be arranged to provide a list of input fields and output fields, such as channel fields 808 that a user may select from and/or map to other flow nodes. Also, in some embodiments, a channel flow may be arranged to accept credential information that enables the service provider to validate and authenticate the service channel.

Figure 9:
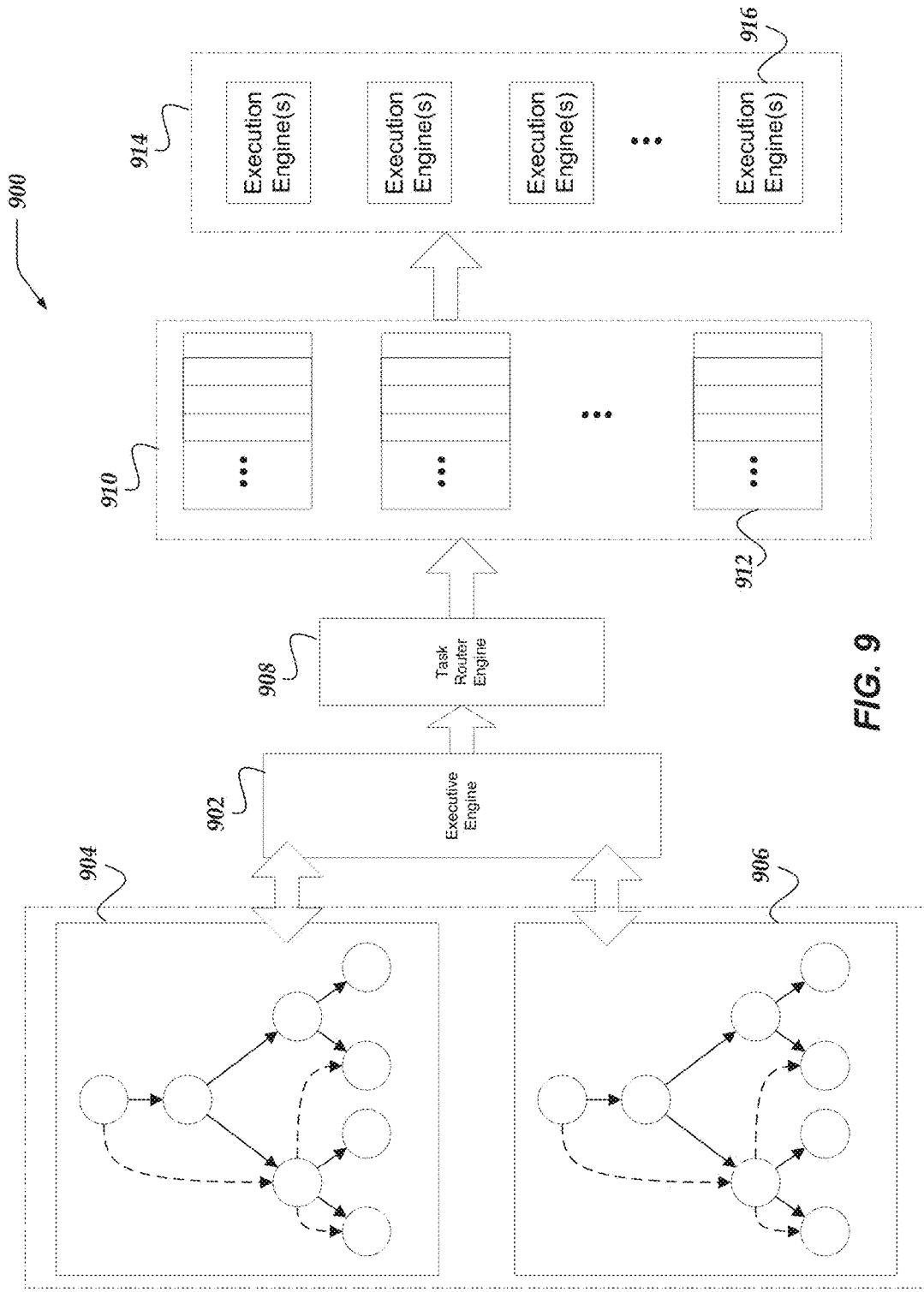
FIG. 9 illustrates a portion of a logical architecture of a system for modeling and executing custom business processes in accordance with at least one of the various embodiments.

In one or more of the various embodiments, one or more nodes in a flow model (e.g., flow model 600), may expand into channel flow models, such as channel flow model 802. In some embodiments, at design time, if a user includes a service channel node in a flow model, that node may represent an underlying channel flow model that models the one or more operations required to interact with a particular service. Accordingly, in this example, channel flow model 802 may be considered to be expanded from a service channel node in a flow model, such as, flow model 600. FIG. 9 illustrates a portion of a logical architecture of system 900 for modeling and executing custom business processes in accordance with at least one of the various embodiments. In some embodiments, system 900 may be described as including various components, including: executive engine 902; one or more flow models, such as flow model 904 and flow model 906; task router engine 908; one or more task queues, such as task queues 910; one or more execution engines, such as, as execution engines 914, or the like. One of ordinary skill in the art will appreciate that systems for modeling and executing custom business processes may include more or fewer components that may be arranged differently than shown here. However, system 900 is sufficient for enabling and disclosing the embodiments herein.

In at least one of the various embodiments, executive engine 902 may be arranged to manage to overall execution of flows. In at least one of the various embodiments, one or more executive engines, such as executive engine 902 may be arranged to traverse one or more flow models, such as flow model 904 and flow model 906. In at least one of the various embodiments, executive engine 902 may be arranged to traverse flow models to select the next one or more flow nodes that should be processed. Also, in at least one of the various embodiments, executive engine 902 may be arranged to maintain one or more data structures for tracking/monitoring status information for each flow models and flow nodes being executed. In at least one of the various embodiments, as flow nodes are selected for executions, executive engine 902 may provide them to a task router engine.

In one or more of the various embodiments, executive engine 902 may be arranged to employ one or more rule-based policies to apply operational policy across multiple flows. These rules may be arranged to include one or more expressions, scripts, programs, or the like, that use flow level metrics, system-wide metrics, user/customer level metrics, to govern the operations of the flows. In some embodiments, these metric values may be collected or computed based on various sources including the executive engine, execution engines, task router engines, or the like. In some embodiments, metrics may include customer data throughput, average task wait times, average number of execution engines running, data storage utilization, CPU/processor utilization, network utilization, tasks per hour, tasks running, or the like.

In at least one of the various embodiments, task router engines, such as task router engine 908 may be arranged to determine where flow nodes are to be executed. In a generic case, task router engine 908 may be arranged to provide flow node tasks to one or more task queue pools, such as task queue pool 910. Accordingly, in at least one of the various embodiments, a packet of information sufficient for executing/performing the one or more tasks associated with the flow nodes may be prepared and provided to a task queue, such as task queue 912.

In at least one of the various embodiments, the information provided to the task queue is arranged such that it is self-contained in the sense that it includes the information necessary for an execution engine to perform the actions to accomplish the task. Accordingly, in some embodiments, one or more execution engines in an execution engine pool, such as execution engine pool 914 may be arranged to monitor one or more task queues. Thus, as tasks are added to the queues the one or more execution engine may obtain the task information from the queue and perform the one or more actions to attempt to complete the task. For example, in some embodiments, execution engine 916 may be arranged to watch/monitor one or more task queues, such as task queue 912 to obtain task information.

In at least one of the various embodiments, some task queues may be arranged to queue flow tasks having certain characteristics. In some embodiments, one or more big-data task queues may be arranged to handle flow tasks that produce large volumes of data. Likewise, task queues may be arranged or configured to handle testing flow tasks, asynchronous (waiting) flow tasks, quarantined flow tasks (e.g., potentially dangerous or broken flow tasks), critical flow tasks, or the like. Also, in some embodiments, one or more task queues may be dedicated to particular execution platforms and/or execution locations.

In at least one of the various embodiments, task queues and/or execution engines may be distributed across one or more networks or computers. For example, in some embodiments, one or more task queues and/or execution engines may be executing in a cloud based computing environment while other task queues and/or execution engines may be located on one or more on-premises computers. In at least one of the various embodiments, one or more task queues and/or execution engines may be located on one or more mobile computers, such as smart phones, tablet computers, or the like.

In one or more of the various embodiments, one or more execution engines may be located on devices, such as Internet-of-Things (IoT) devices or IoT computers. In some embodiments, these execution engine may be arranged to monitoring streams of data produced by the IoT computer and pass control for disposition of the data to other execution engines that may be located elsewhere (cloud/on-premises/another device) based on the rules and heuristics. For example, a low power or low performant sensing computer may locally run an execution engine that samples sensor data from the sensor computer. Accordingly, in this example, the local execution engine may be communicate some or all of the data to another execution engine that may be running in another computing environment.

In one or more of the various embodiments, a user may design flow models such that one or more tasks may be associated with a particular task router or execution engine. In some embodiments, one or more particular task may be associated with a class or group of task routers or a class or group of execution engines. Thus, in some embodiments, tasks may be configured to have an affinity that is global, local, or specific. For example, in one or more of the various embodiments, a particular operation that may be extremely sensitive (e.g., cryptographic hash calculation using a secure key, or the like) may be bound to a particular task router or execution engine to ensure that the sensitive task always executes on a on-premises execution engine to avoid disclosing the secure cryptographic key.

In one or more of the various embodiments, an engine, such as executive engine 902 and task router engine 908 may be arranged to employ one or more heuristic tests to rebalance where execution engines should executed. In one or more of the various embodiments, the heuristics may be used to determine which execution engines should be associated with a given service channel or service connector. Accordingly, in one or more of the various embodiments, service channels or service connectors that are under heavier use may be associated with execution engines that have enough resources (e.g., CPU, memory, or the like) to handle the load.

In at least one of the various embodiments, task routers, such as task router 908 may be arranged to determine the location of the task queue(s) that should be provided the task information associated with a flow node. Also, in some embodiments, task routers themselves may be arranged such that a task router may be configured to route task information to another task router rather than directly to one or more other task queues for subsequent routing.

In at least one of the various embodiments, one or more execution engines may be arranged to monitor task queues that may be remotely located. For example, in some embodiments, a task queue may be in a cloud-computing environment while a monitoring execution engine may be located on a mobile computer.

In at least one of the various embodiments, one or more execution engines may be arranged to actively monitor and/or poll one or more task queues watching for relevant tasks. Also, in some embodiments, one or more task queues may be arranged to notify one or more execution engines if tasks may be available for them.

Figure 10:
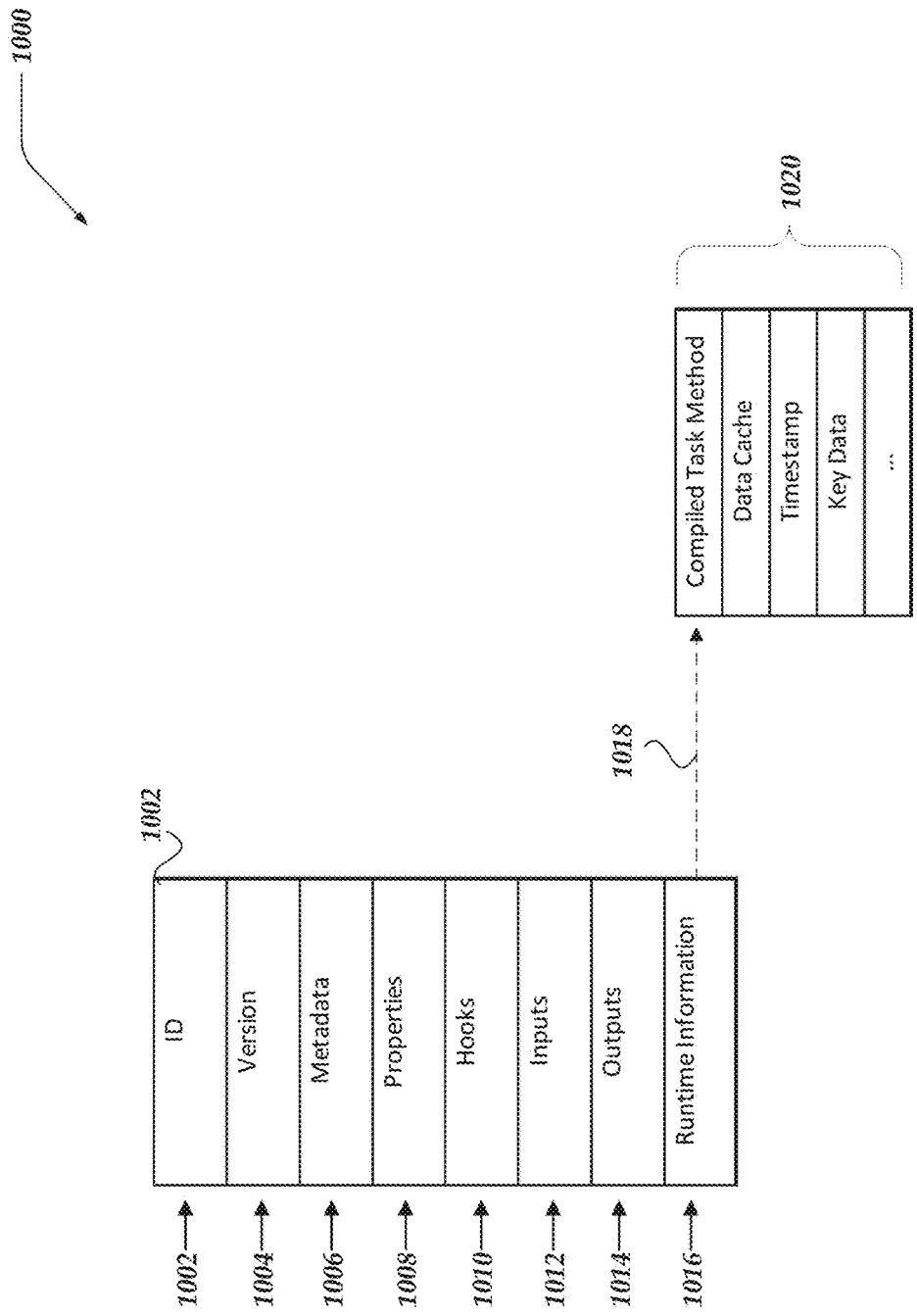
FIG. 10 illustrates a portion of a logical architecture for a task in accordance with at least one of the various embodiments.

FIG. 10 illustrates a portion of a logical architecture for task 1000 in accordance with at least one of the various embodiments. As described above, in some embodiments, an executive engine may be arranged to traverse flow models to select one or more flow nodes. In some embodiments, the selected flow nodes may be transformed into one or more tasks that may be routed to one or more task queues.

In at least one of the various embodiments, tasks may be arranged to be self-contained containers of the data, state, and behavior that enables execution engines to execute them separate and/or independently of their originating flow model.

In at least one of the various embodiments, tasks, such as task 1002 may be arranged to include several type of information used for describing and/or configuring a task. For example, in some embodiments, task 1002 may include data portions such as, identifier 1002, version 1004, metadata 1006, properties 1008, hooks 1010, inputs 1012, outputs 1014, runtime information 1016.

In at least one of the various embodiments, identifier 1002 may be unique identifier the identifies a particular task. Version 1004 may be a version identifier that may be used by version management and compatibility checking. Metadata 1006 may include information such as, display name, description, or the like. Properties 1008 may include various properties for determining how the task may be displayed, executed, terminated (e.g., timeout values), hints for compiling, error policies, or the like. Hooks 1010 may include references to one or more other flow models that may be executed at predefined points in the life of the task, such as before the task runs, after the task runs, or the like. Inputs 1012 may be arranged include the input values that should be provided to the task, it may include a information about their default and runtime values, expected types, mutability rules, display properties, or the like. Outputs 1014 may be arranged to include the set of outputs on a task and may include contain information about their default and runtime values, expected types, mutability rules, display properties, or the like. And, runtime information 1016 may be arranged to include runtime information used by the execution engine while running the tasks. This may include task state flags, a reference to the compiled task method that implements the task, policy function references for error handling, runtime configuration and partner key data, and metadata about the method, such as cached data and timestamps.

In at least one of the various embodiments, the information included in task 1002 may be compiled to produce a compiled task method that is executed by the execution engines. In some embodiments, runtime information 1016 may include a reference (e.g., reference 1018) to the compile task method and various other runtime properties (e.g., runtime properties 1018).

Generalized Operations

FIGS. 11-26 represent the generalized operations for modeling and executing custom business processes in accordance with at least one of the various embodiments. In at least one of the various embodiments, processes 1100, 1200, 1300, 1400, 1500, 1600, 1700, 1800, 1900, 2000, 2100, 2200, 2300, 2400, 2500, and 2600 described in conjunction with FIGS. 11-26 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 11-26 may be operative in modeling business processes and for visualizing process models such as described in conjunction with FIGS. 4-10.

Figure 11:
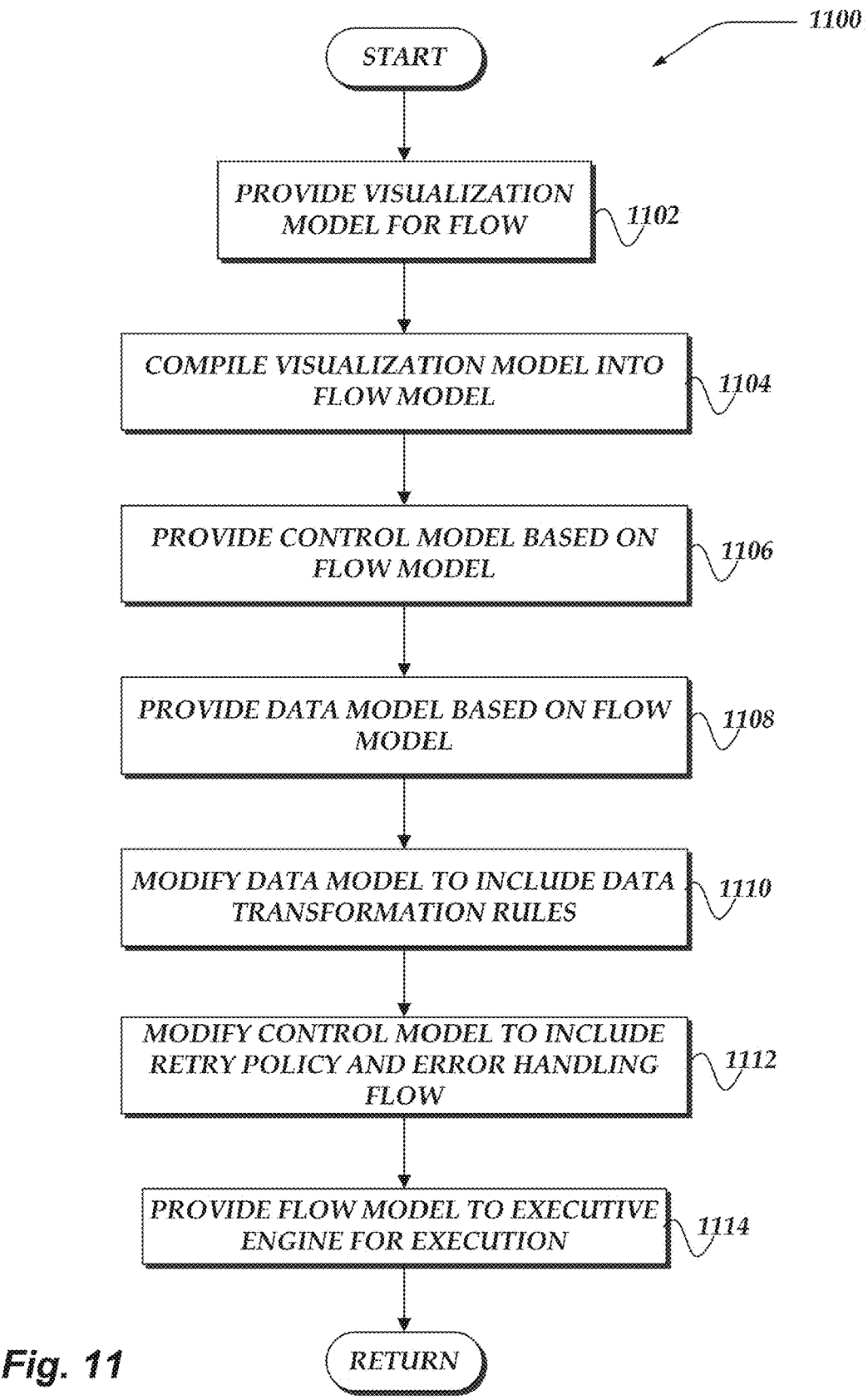
FIG. 11 illustrates an overview flowchart for a process for modeling and executing custom business processes in accordance with at least one of the various embodiments.

FIG. 11 illustrates an overview flowchart for process 1100 for modeling and executing custom business processes in accordance with at least one of the various embodiments. After a start block, at block 1102, in at least one of the various embodiments, a visualization model may be provided for modeling a flow. In at least one of the various embodiments, users may be enabled to create visualization models using a user interface application. Accordingly, as described above a user may define flow nodes, inputs, outputs, filters, type constraints, or the like, as described for FIGS. 4 and 5.

At block 1104, in at least one of the various embodiments, a modeling engine may be arranged to compile a visualization model into a flow model. In at least one of the various embodiments, the modeling engine may be arranged to transform visualization model flow nodes into flow model flow nodes. Likewise, the modeling engine may transform input/output definitions included in a visualization model into edges of a flow model that connect the various flow nodes.

In one or more of the various embodiments, the modeling engine may be arranged to employ one or more cycle detection rules to identify infinite loops or potential infinite loops that may be inadvertently included in a flow model. One or more well-known cycle detection algorithms such as tortoise and hare algorithms, Brent's algorithm, or the like.

At block 1106, in one or more of the various embodiments, a control model based on the flow model may be provided. In one or more of the various embodiments, the control model may be considered to be overlaid on the flow model. In some embodiments, the vertexes (e.g., nodes) control model may be arranged to share the flow node data structures of its associated flow model. Accordingly, in some embodiments, the state/transition rules may be modeled using the control model without having to duplicate the flow node data. In some embodiments, the state transition information for control models may be associated with the edges of the control model that define transition relationships between flow nodes.

At block 1108, in one or more of the various embodiments, a data model based on the flow model may be provided. In one or more of the various embodiments, the data model may be considered to be overlaid on the flow model. In some embodiments, the vertexes (e.g., nodes) of the data model may be arranged to share the flow node data structures of its associated flow model. Accordingly, in some embodiments, data flow information such as, data transformation rules, data passing rules, or the like, may be modeled using the data model absent duplicate flow node data. In some embodiments, the data flow information for data models may be associated with the edges of the data model that may be different and/or separate from the edges of the control model.

At block 1110, in one or more of the various embodiments, the data model may be modified to include one or more data transformation rules. In one or more of the various embodiments, during the compilation of the flow model, the data model may be modified as the modeling engine encounters visualization model nodes that may be associated with field type information, or the like.

At block 1112, in one or more of the various embodiments, the control model may be modified to include retry policies and/or error handling flows. In one or more of the various embodiments, each visualization model node may be associated with information defining a retry policy that may be generated and associated with one or more corresponding flow nodes.

Likewise, in one or more of the various embodiments, each visualization model node may be associated with information defining error handling. Accordingly, in one or more embodiments, the modeling engine may provide one or more error handling flow models that may be associated with the control model.

At block 1114, in one or more of the various embodiments, the flow model may be provided to an executive engine for execution. In one or more of the various embodiments, an executive engine may be arranged to execute a flow using the flow model. As described above, the executive engine may be arranged to traverse one or more flow models and provide one or more flow tasks to task queues for execution by one or more execution engines. Also, in one or more of the various embodiments, the flow model including its corresponding data model and control model may be stored for later use. In some embodiments, the flow model may represent a partial process that may be embedded in other flow models. Next, in at least one of the various embodiments, control may be returned a calling process.

Figure 12:
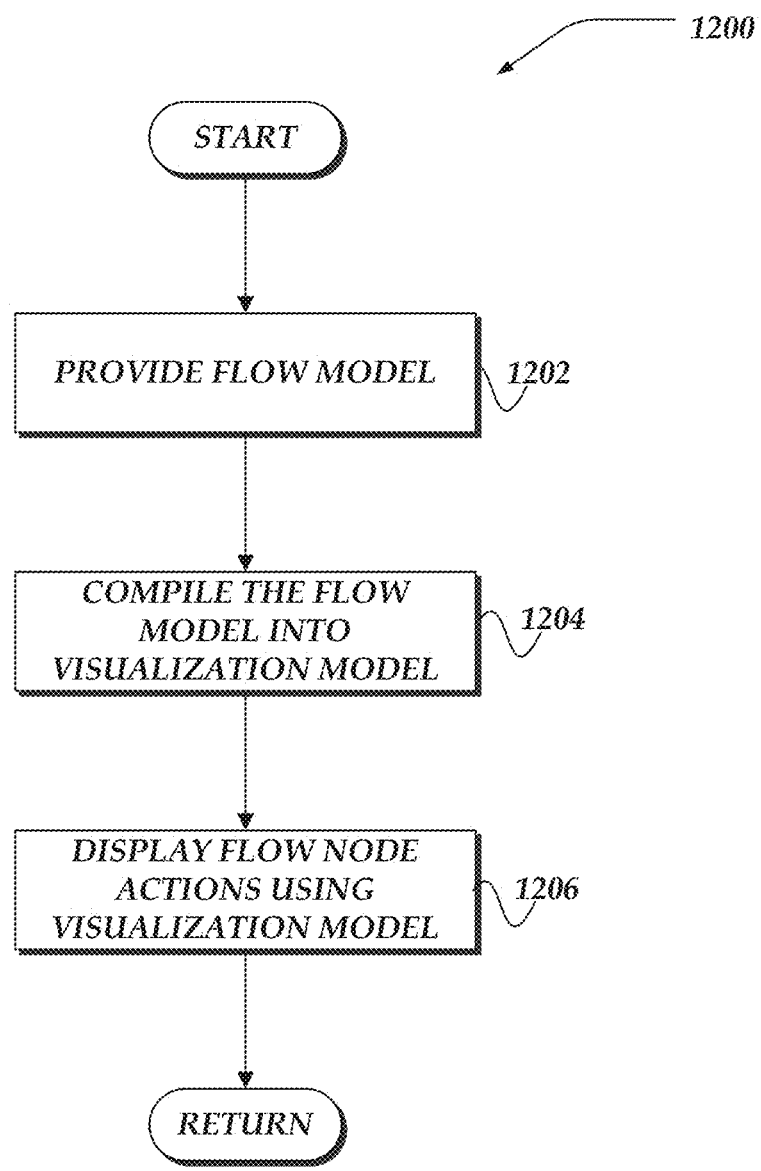
FIG. 12 illustrates an overview flowchart for a process for modeling and executing custom business processes in accordance with at least one of the various embodiments.

FIG. 12 illustrates an overview flowchart for process 1200 for modeling and executing custom business processes in accordance with at least one of the various embodiments. After a start block, at block 1202, in at least one of the various embodiments, a flow model may be selected and provided to a visualization engine. In at least one of the various embodiments, a user may select a flow model from a list of flow model that may be displayed in a user-interface.

At block 1204, in at least one of the various embodiments, the flow model may be compiled into visualization model. In at least one of the various embodiments, a visualization engine may be arranged to traverse a flow model and create a corresponding visualization model.

In one or more of the various embodiments, flow models control model may be traversed to determine transition relationships for the visualization model. Likewise, in some embodiments, the data model may be traversed to discovered data flow and/or field information included in the visualization model.

At block 1206, in at least one of the various embodiments, display the flow using the visualization model. In at least one of the various embodiments, generating a visualization model enables the flow to be displayed in an interactive user interface. Accordingly, while the flow may be optimized for efficient processing and/or data modeling, the visualization model may enable visual representations that may be optimized for user display and user interaction.

Next, control may be returned to a calling process.

Figure 13:
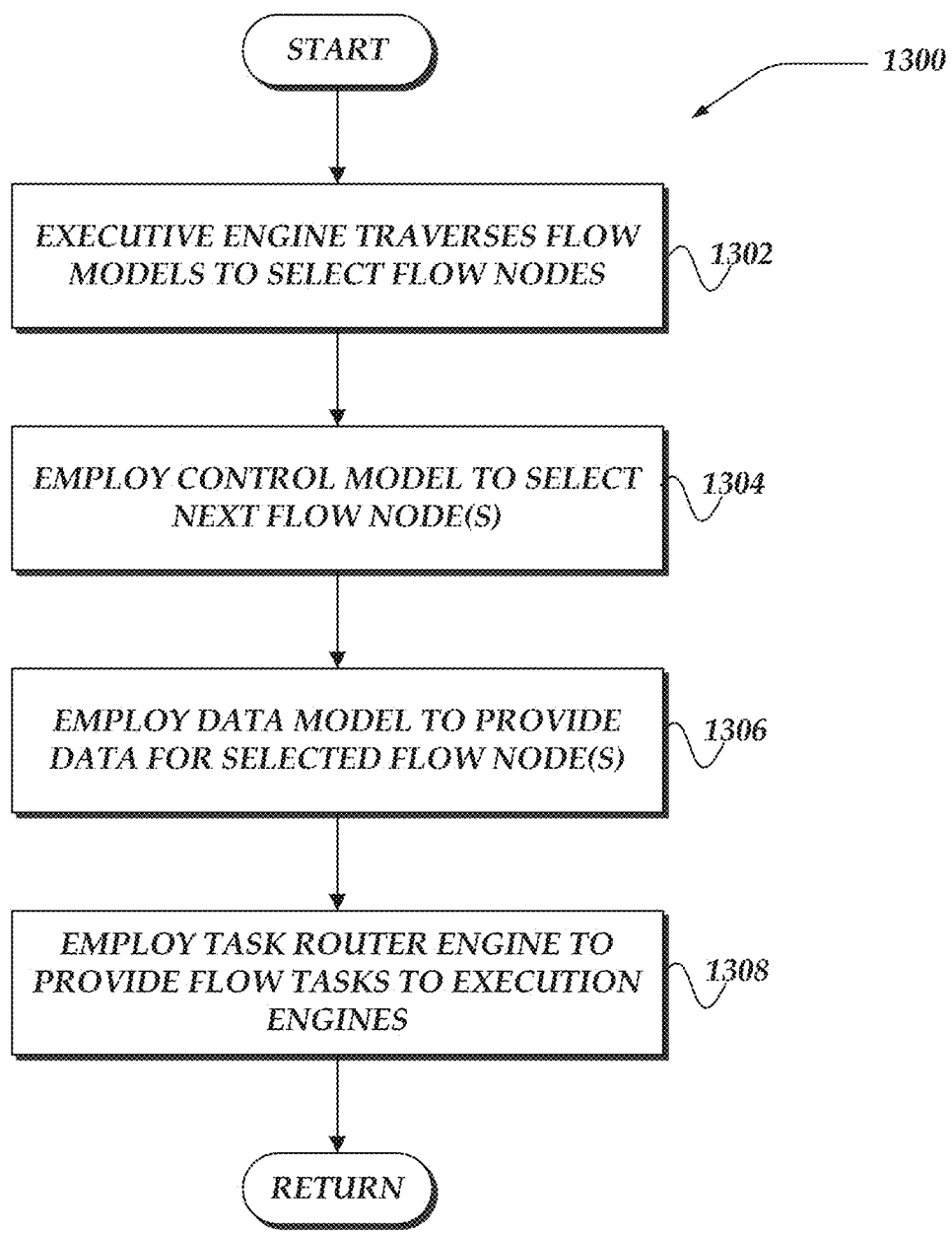
FIG. 13 illustrates an overview flowchart for a process for executing flow models processes in accordance with at least one of the various embodiments.

FIG. 13 illustrates an overview flowchart for process 1300 for executing flow models processes in accordance with at least one of the various embodiments. After a start block, at block 1302, in at least one of the various embodiments, an executive engine may be arranged to traverse one or more flow models to select flow nodes. In at least one of the various embodiments, configuration information may be provided to the executive engine that enables it to selected one or more flow models for execution. In some embodiments, this may be the set of flow models that are tagged or otherwise indicated as being active and/or ready for processing.

In at least one of the various embodiments, there may be more than one executive engine processing independent flow models concurrently. Also, in some embodiments, executive engines may be arranged to employ one or more scheduling method for selecting among a plurality flow models to process. For example, in some embodiments, one or more executive engines may be arranged to employ round-robin scheduling, weighting round-robin scheduling, manual scheduling, or the like.

At block 1304, in at least one of the various embodiments, the executive engine may traverse the control model to identify the next flow node for the one or more flow models it is processing. In at least one of the various embodiments, the control model defines how flow nodes in a flow model are connected/related. Accordingly, in some embodiments, the executive engine may traverse control models of flow models to identify the next flow nodes that should be processed.

At block 1306, in at least one of the various embodiments, the executive engine may employ data models for flow models to determine how data flows between the flow nodes. In at least one of the various embodiments, as described above, the data in flow may be provided to flow nodes using a path that may deviate from the control model. Also, in some embodiments, the data model may be arranged to define data transformations, data type casting/coercion, data validation, data restrictions, data filters, or the like.

At block 1308, in at least one of the various embodiments, a task router may be employed to provide flow tasks to one or more execution engines. In at least one of the various embodiments, the executive engine may select the flow nodes and package them into flow tasks. In some embodiments, the flow task may be compiled into a package that includes the flow nodes information determined using the control model and data and/or data processing information provided by the data model.

In at least one of the various embodiments, the executive engine may include sufficient information in the flow task package so it may be executed independently by one or more local or remote execution engines.

In at least one of the various embodiments, the task router may select a task queue from one or more task queue flows and add the flow task to the selected task queue. In some embodiments, the selected task queue may be local or remote from the task router. In some embodiments, the task router may provide the flow task to another task router for further routing.

In some embodiments, task queues may be arranged to implement various queuing strategies, such as, first-in-first-out (FIFO) queues, priority queues, or the like, depending on configured policies or rules.

In at least one of the various embodiments, one or more execution engines may be arranged to obtain flow tasks from one or more task queues. Subsequently, execution engines that obtain a flow task from the task queue may execute it. Next, control may be returned to a calling process.

Figure 14:
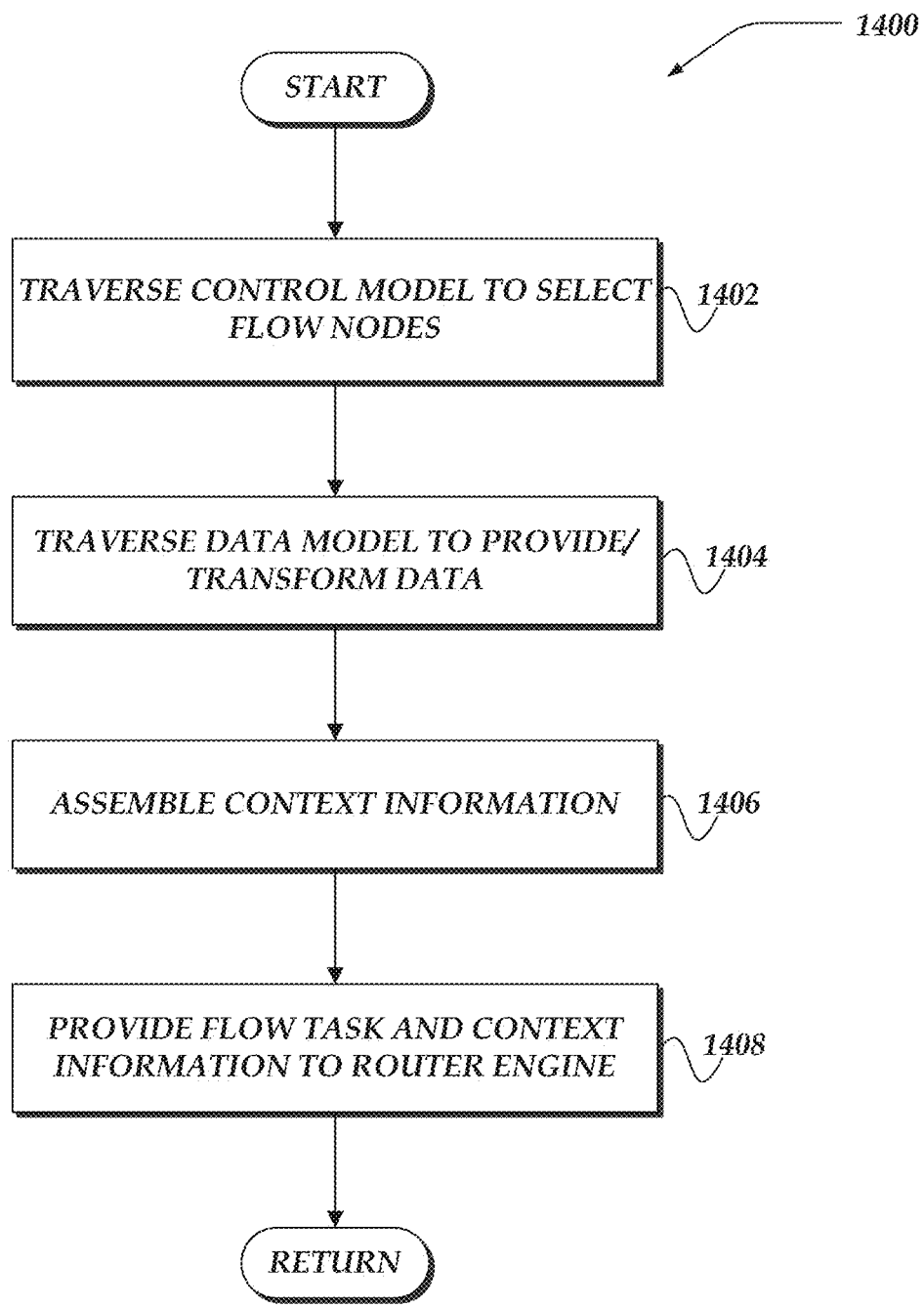
FIG. 14 illustrates a flowchart for a process to perform one or more portions of the actions for an executive engine to provide flow tasks in accordance with at least one of the various embodiments.

FIG. 14 illustrates a flowchart for process 1400 to perform one or more portions of the actions for an executive engine to provide flow tasks in accordance with at least one of the various embodiments. After a start block, at block 1402, in at least one of the various embodiments, an executive engine may be arranged to traverse the control model of a flow model to select the next flow node.

At block 1404, in at least one of the various embodiments, the executive engine may be arranged to traverse the data model to collect data required by the selected flow node. In some embodiments, the data model may be used to associate one or more data transformation rules for the data. In some embodiments, the executive engine may be arranged to perform the data transformations on data that may be available.

At block 1406, in at least one of the various embodiments, the executive engine may be arranged to assemble context information that may be associated with the flow node. In some embodiments, context information may include copies of untransformed data provided by upstream flow nodes. Also, in some embodiments, context information may be arranged to include records and/or references to previously processed/executed flow nodes.

Also, in some embodiments, customer information used for interacting with one or more services referenced by the flow node may be added to the context information. For example, customer information may include credential information that may be used for accessing external service providers. Accordingly, in some embodiments, if a customer has multiple flows or flow nodes that access a given external service, credentials stored in customer information data stores may be used/reused as needed. Also, in at least one of the various embodiments, updating/modifying customer information may automatically propagate changes to existing flow models and/or flow nodes.

At block 1408, in at least one of the various embodiments, the executive engine may package the flow node, the input data, the context information, or the like, into a flow task that may be provided to a task router. In at least one of the various embodiments, the particular task router may be selected based on configuration information, rule-based policies, or the like. For example, in some embodiments, a default task router may be configured. In other embodiments, rule may be executed that select a task router based on the flow model, the current flow node, or the like. Likewise, additional considerations such as load balancing may be applied during the selection of the task router.

In at least one of the various embodiments, the flow task may be communicated to remote task routers over a network using one or more communication protocols, such as, TCP/IP, or the like. Also, in at least one of the various embodiments, if the executive engine and the selected task router may be on the same host, one or more inter-process communication methods, such as, sockets, pipes, message queues, shared memory memory-mapped files, or the like. Next, control may be returned to a calling process.

Figure 15:
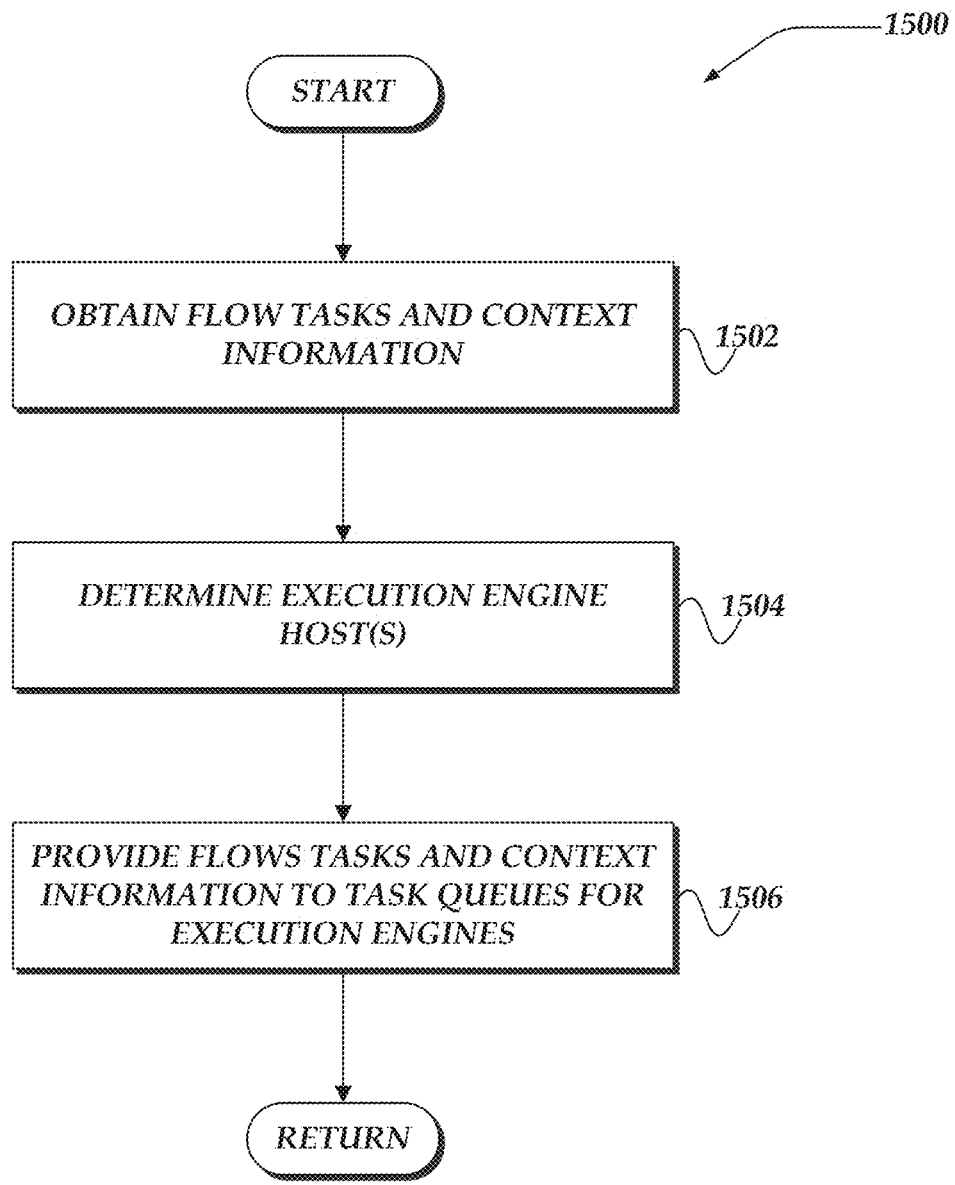
FIG. 15 illustrates a flowchart for a process that provides task routing services in accordance with at least one of the various embodiments.

FIG. 15 illustrates a flowchart for process 1500 that provides task routing services in accordance with at least one of the various embodiments. After a start block, at block 1502, in at least one of the various embodiments, a task router engine may be provided one or more flow tasks. In at least one of the various embodiments, the task router engine may be arranged to accept one or more flow tasks that have been created from one or more flow nodes. In some embodiments, an executive engine may be arranged to transform a flow node into a flow task and then provide the flow task to the task router engine. In at least one of the various embodiments, the task router engine may be arranged to transform flow nodes into flow tasks rather than relying on the executive engine to perform those actions.

At block 1504, in at least one of the various embodiments, the task router engine may be arranged to determine one or more execution hosts that may be responsible for executing the flow tasks. In at least one of the various embodiments, the determination may be made based on meta-data and/or context information that may be included with the flow task. In some embodiments, this type of meta-data may include explicit names, tags, directions for selecting the execution hosts. For example, the flow task may be designated for executing on a particular host. While in other cases, any available host may be acceptable.

In at least one of the various embodiments, the task router engine may be arranged to apply one or more routing rules for determining the execution hosts. In some embodiments, meta-data in the flow task may be mapped directly to one or more particular hosts. In some other embodiments, the task router engine may be arranged to apply rules that include pattern matching for selecting execution hosts. In other embodiments, other information, such as flow name, flow owner, flow task source, time-of-day, load balancing issues, flow context information, security concerns (e.g., some flow tasks may be required to access data that may be limited to being accessed from certain hosts), input sources, output targets, or the like, or combination thereof. In some embodiments, users (e.g., flow designers) may expressly designate particular hosts or required host characteristics that may be honored by the task router engine.

In at least one of the various embodiments, the task router engine may determine that the flow task should be provided to another task router engine rather than to specific execution engines/hosts. Accordingly, in some embodiments, the task router engine may identify another task router engine and forward the flow task to that other task router engine.

At block 1506, in at least one of the various embodiments, the task router engine may be arranged to provide the flow tasks to one or more task queues that may be associated with the determined execution engine hosts. In at least one of the various embodiments, one or more execution engine may be associated with one or more task queues. Accordingly, in some embodiments, task router engines may be arranged to identify the appropriate task queues that may be associated with the determined execution engines. Accordingly, in at least one of the various embodiments, if the task queue is remote from the task router engine, the flow tasks may be provided over network. Likewise, if the task queue is local to the task router engine, the flow task may be provided using local communication facilities. Next, control may be returned to a calling process.

Figure 16:
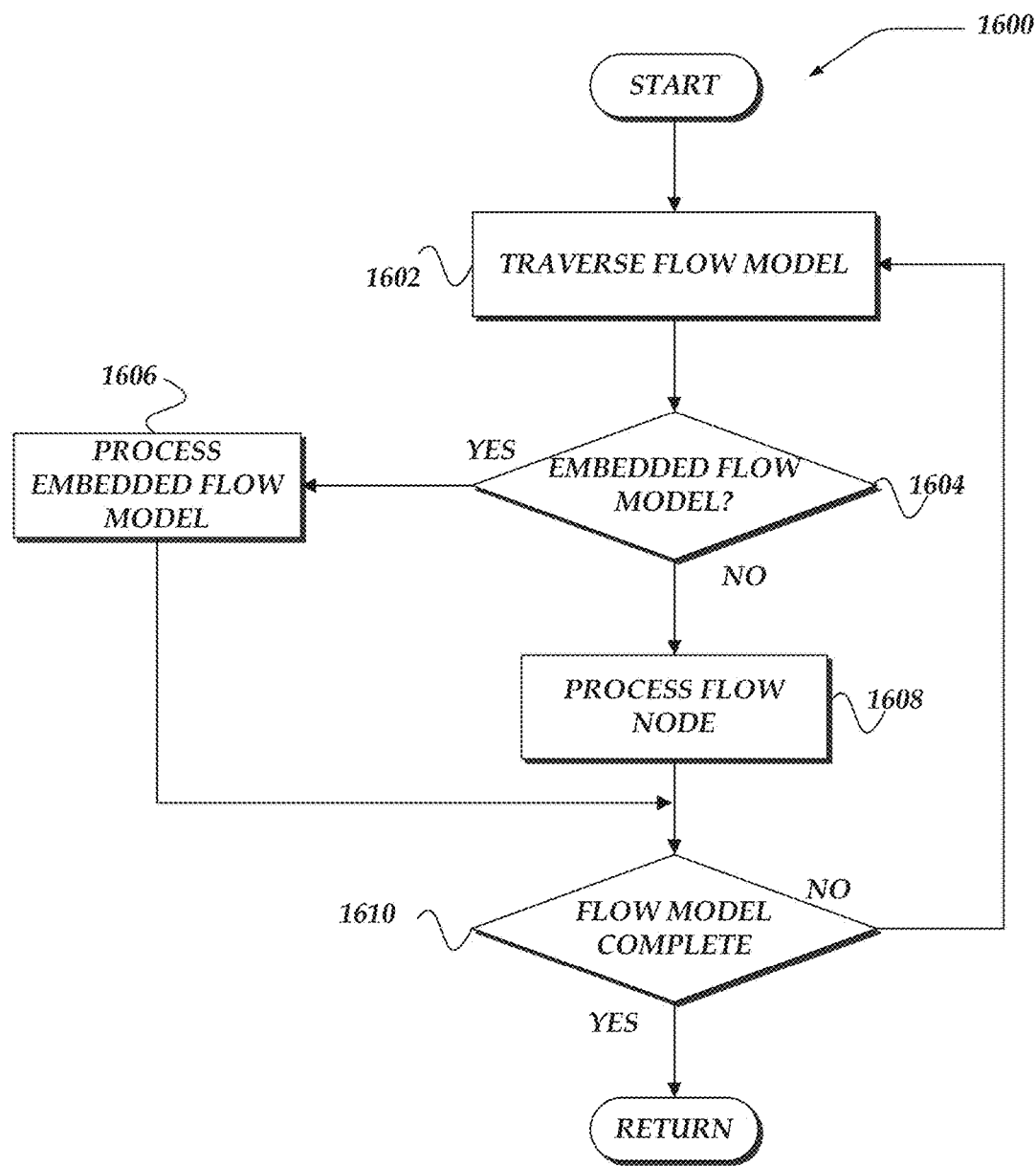
FIG. 16 illustrates a flowchart for a process that executes flow modes in accordance with at least one of the various embodiments.

FIG. 16 illustrates a flowchart for process 1600 that executes flow modes in accordance with at least one of the various embodiments. After a start block, at block 1602, in at least one of the various embodiments, an executive engine may be arranged to traverse a flow model to select flow nodes that may be transformed into flow tasks for execution. At decision block 1604, in at least one of the various embodiments, if an embedded flow may be encountered during the traversal of the flow model, control may transfer to block 1606; otherwise, control may transfer to block 1608. In at least one of the various embodiments, other flow models or flow model portions may be embedded in another flow model. Accordingly, in at least one of the various embodiments, the encountered flow node may be a reference to another flow model rather than corresponding to one or more flow tasks.

At block 1606, in at least one of the various embodiments, the executive engine may be arranged to traverse the embedded flow model to identify flow nodes for execution. In at least one of the various embodiments, if the executive engine may be finished with the embedded flow model, control may transfer to decision block 1610.

In at least one of the various embodiments, the embedded flow model may be arranged to execute independently. Accordingly, in some embodiments, one or more embedded flow models may be executed concurrently with one or more flow nodes of the parent flow model.

At block 1608, in at least one of the various embodiments, since the current flow node is not an embedded flow model, the executive engine may process the flow node normally.

At decision block 1610, in at least one of the various embodiments, if the executive engine has finished processing the flow model, control may be returned to a calling process; otherwise, control may loop back to block 1602 to continue processing the flow model.

Figure 17:
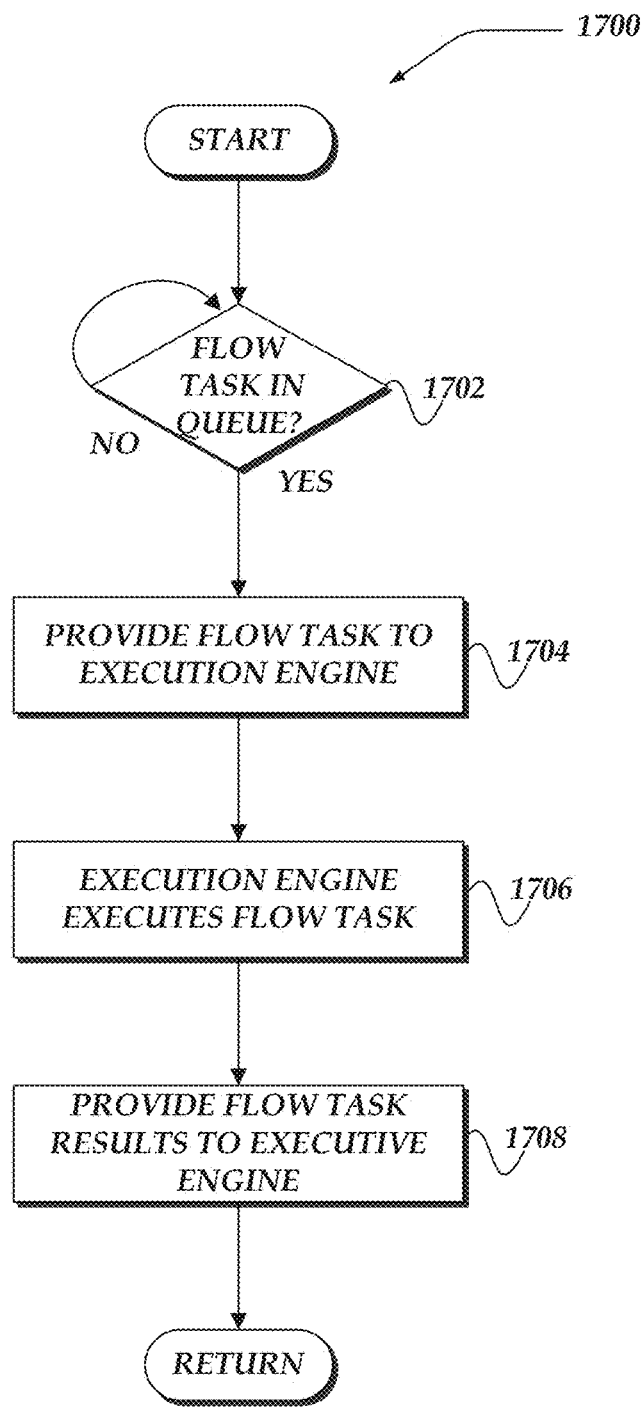
FIG. 17 illustrates a flowchart for a process for executing flow tasks in accordance with at least one of the various embodiments.

FIG. 17 illustrates a flowchart for process 1700 for executing flow tasks in accordance with at least one of the various embodiments. After a start block, at decision block 1702, in at least one of the various embodiments, if one or more flow task may be available in a task queue, control may transfer to block 1704; otherwise, control may loop back to decision block 1702.

At block 1704, in at least one of the various embodiments, one or more execution engines may be associated with one or more task queues. Accordingly, in some embodiments, one or more execution engines may be arranged monitor their associated task queues. If flow tasks may be present in associated task queues, an execution engine may obtain the flow task.

In at least one of the various embodiments, execution engines may be arranged to actively monitor task queues using one or more polling methods. In such embodiments, execution engines may be configured to periodically check (e.g., poll) task queues for flow tasks. In some embodiments, execution engines may be arranged to automatically check task queues if they complete or suspend a flow task they may be performing.

In some other embodiments, execution engines may be notified if flow tasks are available. Accordingly, in some embodiments, the task queues may provide notifications to one or more associated execution engines if flow tasks are in queue. In at least one of the various embodiments, execution engines may be configured and arranged to sleep or otherwise go into an idle state unless they are processing a flow task.

In at least one of the various embodiments, execution engines may be organized into one or more pools such that a minimum number of execution engines may remain instantiated and if more are needed to service flow task they may be initiated as demand increased up to a configured maximum number of execution engine.

In at least one of the various embodiments, the minimum and maximum number of execution engines allocated to particular users and/or customers may be defined based on business arrangements and/or service level agreements.

At block 1706, in at least one of the various embodiments, execution engines that have flow tasks may execute the tasks. As described above, flow tasks include instructions for performing the task and the associated context information. For example, in some example, a flow task may be arranged to provide a request to an external service, such as a search engine query. Accordingly, for this example, the flow task may define the search query command, its parameters (e.g., the query), location of search engine (e.g., URL), or the like. Thus, in this example, the execution engine may be arranged to execute the query command (e.g., HTTP GET) and collect the results and/or error codes.

At block 1708, in at least one of the various embodiments, the results of executing the flow task may be provided to the execution engine. In at least one of the various embodiments, execution engines execute flow tasks independent from the overall flow model being used. Accordingly, the execution engine may be arranged to provide the result of flow task actions to the executive engine. The executive engine may then process the results consistent with the overall flow model. Next, control may be returned to a calling process.

Figure 18:
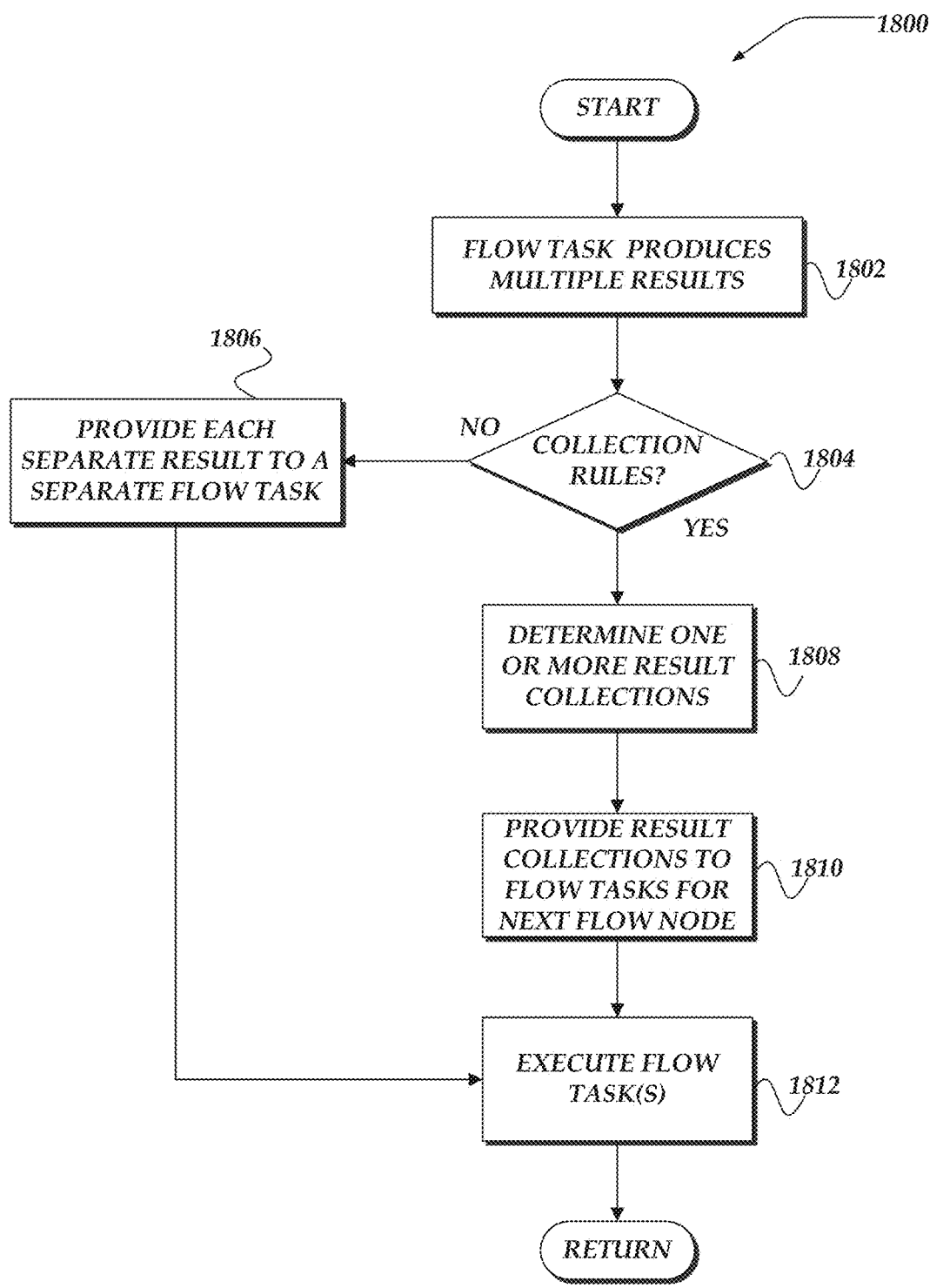
FIG. 18 illustrates a flowchart for a process to handle flow tasks that produce multiple the results in accordance with at least one of the various embodiments.

FIG. 18 illustrates a flowchart for process 1800 to handle flow tasks that produce multiple the results in accordance with at least one of the various embodiments. After a start block, at block 1802, in at least one of the various embodiments, one or more flow models may include one or more flow tasks that may produce multiple results for one action. For example, in some embodiments, a flow task may be a query made to an external service that produces a result set that includes multiple records.

At decision block 1804, in one or more of the various embodiments, if collection rules are activated the flow task, control may flow to block 1808; otherwise, control may flow to block 1806. In one or more of the various embodiments, flow tasks may be configured to use collection processing to handle multiple results. In one or more of the various embodiments, the executive engine may receive the results and provide them to the next flow task as per its flow model.

At block 1808, in one or more of the various embodiments, each separate result records/value may be provided to a separate flow task. In one or more of the various embodiments, the executive engine may instantiate one flow task for each result set record. Accordingly, in one or more of the various embodiments, each flow task may be provided a single result records and added to the task queue. In one or more of the various embodiments, the flow tasks may be arranged to perform actions in parallel and/or concurrently. For example, a flow model may be arranged to include a flow node that is arranged to execute a search engine query and send the results to another flow node that emails the results to a user. Accordingly, in this example, each result may be provided to the email flow node, such that the executive engine may generate one flow task for each result. In this example, a result set of 25 records would produce 25 flow tasks based for the flow node designed to send the emails. Likewise, in this example, a result set of 100 records would produce 100 flow tasks to send emails.

At block 1808, in one or more of the various embodiments, one or more result collections may be determined. In one or more of the various embodiments, the results from the previous flow node (generated by a flow task) may be arranged into one or more collections. Accordingly, in one or more of the various embodiments, the executive engine may be arranged to group results into sets containing a defined number of items. In one or more of the various embodiments, the maximum number of records in a collection may be defined per node when the flow model is designed. In some embodiments, a default maximum collection size value may be defined for an entire flow model. Alternatively, in some embodiments, each flow node may be configured to have a local maximum collection size. If the flow node includes local maximum collection size, it may override model-wide (or system wide) defaults. For example, in some embodiments, given a maximum collection size of 100, a result set of 1200 records will result in 12 collections of records—each with 100 records.

In one or more of the various embodiments, flow nodes may be arranged to accept unbounded collections (within machine limits) or maximum collection size may be set to a very large number. For example, referring to email example above, the flow node arranged to email search engine query results may be configured to accept all the results in a single collection, thus a single email that includes/references all the search engine results for a query may be sent in a single email.

In one or more of the various embodiments, collections be configured to use a concurrency property to limit the number of child flows or tasks that may be instantiated to process tasks associated with collection members. In one or more of the various embodiments, if an executive engine is parsing through a collection to call a child flow, the concurrency property controls how many instances of that child flow may be executed in parallel. For example, if 1000 records are provided in a collection and a step in flow that calls a child flow is encountered, the concurrency value will determine the number of child flows that are instantiated. For example, in some embodiments, if concurrency property value is 10, it limited the number of spawned children flows to 10 at a time. In this example, if all 10 are finished, the next set starts. In this example, this will happen 100 times.

At block 1810, in one or more of the various embodiments, the result collections may be provided to one or more flow tasks for the next flow node in the flow model. In one or more of the various embodiments, the execution engine may be arranged to provide one flow task for each collection. Thus, in some embodiments, each flow task may be provided one collection. Accordingly, for example, if there are 12 collections, the executive engine may be arranged provide 12 flow tasks to be added to the task queues.

At block 1812, in one or more of the various embodiments, the flow tasks may be executed. As described above, flow tasks are assigned to execution queues and executed by execution engines. Accordingly, in one or more of the various embodiments, flow tasks with collections may be executed normally with a collection of values as task inputs rather than a single value as a task input. Next, control may be returned a calling process.

Figure 19:
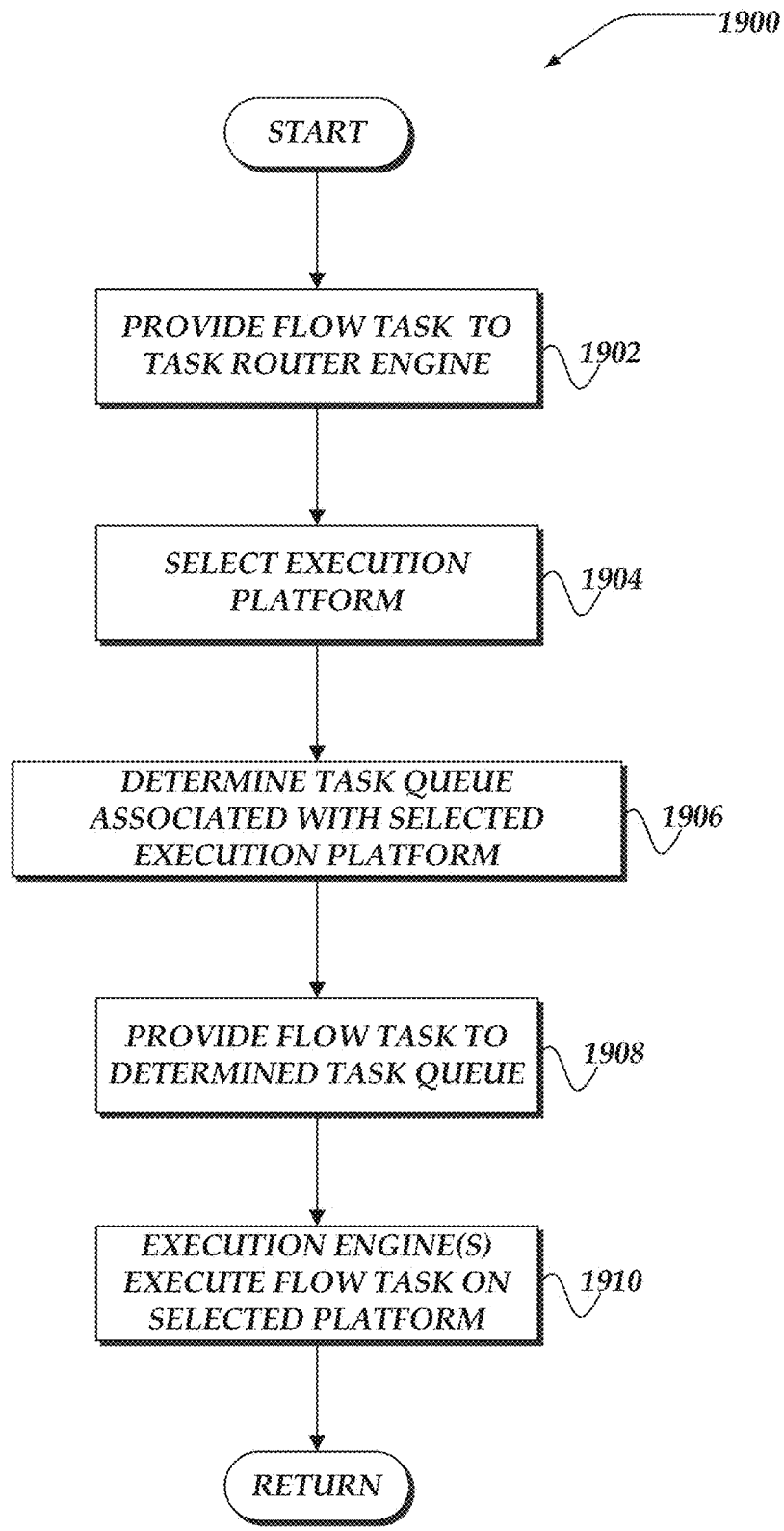
FIG. 19 illustrates a flowchart for a process to routing flow tasks to selected execution platforms in accordance with at least one of the various embodiments.

FIG. 19 illustrates a flowchart for process 1900 to routing flow tasks to selected execution platforms in accordance with at least one of the various embodiments. After a start block, at block 1902, in at least one of the various embodiments, the executive engine may be arranged to provide one or more flow tasks to a router engine. As described above, in some embodiments, router engine may be arranged to route flow tasks to particular task queues for execution by particular execution engines. Further, in one or more of the various embodiments, one or more task queues may be associated with particular execution platforms.

In one or more of the various embodiments, execution platforms may be considered the computer (e.g., client computer, network computer, mobile computer, smartphone, industrial control unit, or the like) that the flow task may be assigned/intended to be executed. In one or more of the various embodiments, while many flow tasks may be arranged to be effective on a variety of computers, in some embodiments, some flow tasks may be required to execute on a particular computer. For example, if one or more flow tasks may be arranged to access secured data unavailable from outside networks, these flow task may be required to execute inside the secure network. Likewise, for example, one or more flow tasks actions may be latency sensitive, such as real-time sensor reading, or the like.

In one or more of the various embodiments, one or more execution engines may be arranged to operate on particular platforms. Accordingly, in some embodiments, these execution engines may be enabled to execute flow tasks on their particular platform.

At block 1904, in one or more of the various embodiments, the execution platform may be selected. In one or more of the various embodiments, the task router engine may be arranged to identify a qualified platform based on configuration information (e.g., task routing information) included in the flow task.

In one or more of the various embodiments, each flow may be associated with a complexity score based on various performance metrics associated with the flow. Accordingly, in one or more of the various embodiments, the complexity score may be used in rule-based policies that may determine where to execute a given flow and whether the flow is synchronous or asynchronous.

At block 1906, in one or more of the various embodiments, the task router engine may be arranged to determine a task queue that may be associated with the selected execution platform.

In one or more of the various embodiments, task queues may be associated with one or more execution platforms. Accordingly, in some embodiments, selecting a task queue may implicitly select the execution platform.

At block 1908, in one or more of the various embodiments, the flow task may be provided to the determined task queue. In one or more of the various embodiments, the executive engine may be arranged to communicate the flow task information the selected task queue. In one or more of the various embodiments, task queues may be located separate from the execution platform. For example, in some embodiments, the task queue may be in a cloud-based environment or otherwise reachable by its execution engines over an accessible network. Alternatively, in some embodiments, the task queues may be located on the execution platform or co-located such that the execution engine may access the task queue.

In one or more of the various embodiments, the flow models, flow task information, flow tasks, context information, or the like, may be arranged to be serialized by the executive engine or task router engine. Accordingly, the serialized flow models, flow task information, flow tasks, context information, or the like, may be moved from platform to platform. The serialized flow models, flow task information, flow tasks, context information, or the like, may be de-serialized on target platform to be executed.

At block 1910, in one or more of the various embodiments, one or more execution engines running on the selected execution platform may execute the flow task. In one or more of the various embodiments, the execution engines running on the selected execution platform may obtain the flow task from their designated task queues.

Next, in one or more of the various embodiments, control may be returned to a calling process.

Figure 20:
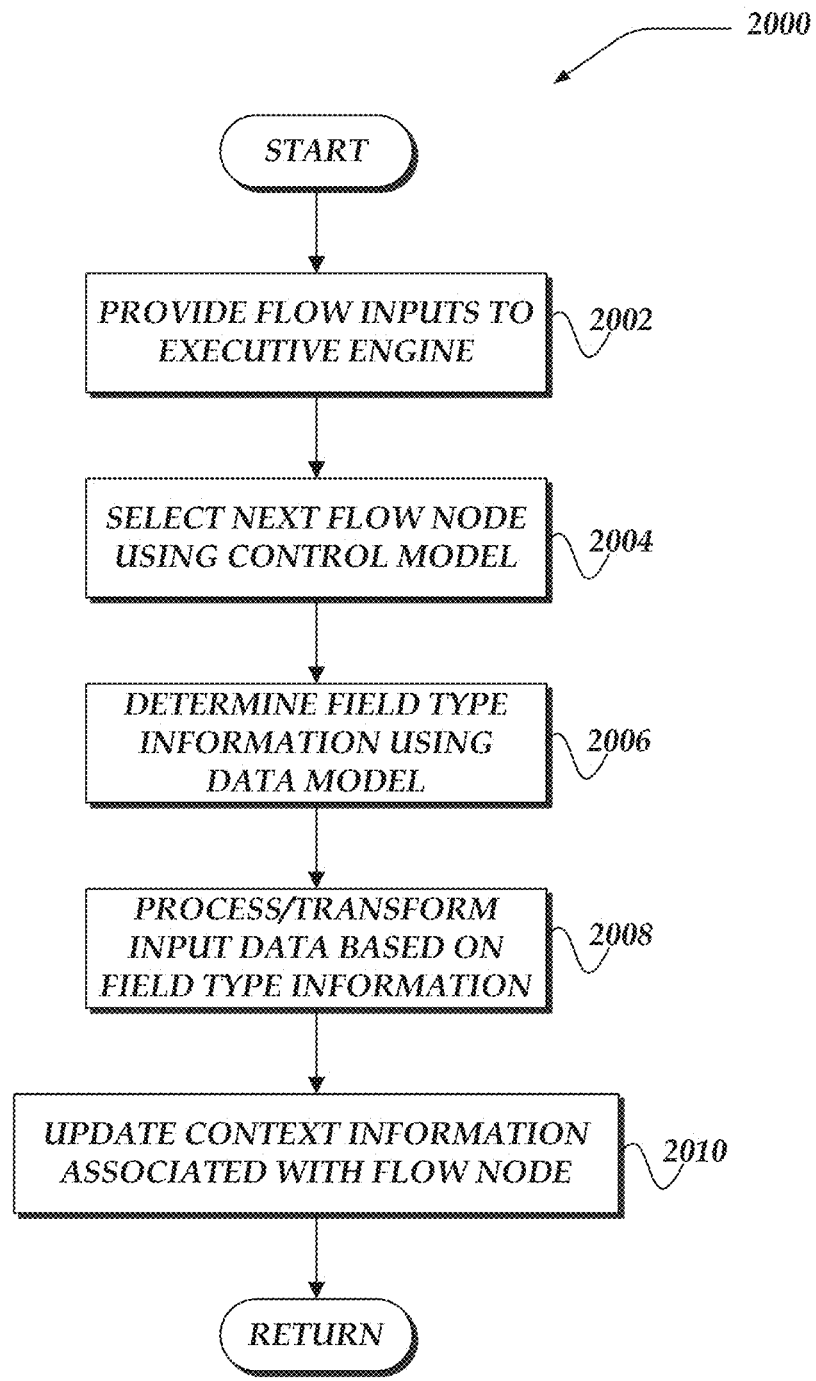
FIG. 20 illustrates a flowchart for a process for handling field type information for flows in accordance with at least one of the various embodiments.

FIG. 20 illustrates a flowchart for process 2000 for handling field type information for flows in accordance with at least one of the various embodiments. After a start block, at block 2002, in at least one of the various embodiments, one or more flow inputs may be provided to the executive engine. As described above, flow inputs may be data provided by the another previously executed flow task. E.g., the inputs of the next flow node may be some or all outputs of a previously executed flow task.

At block 2004, in one or more of the various embodiments, the executive engine may be arranged to traverse the control model associated with a flow model. As described above, traversing the control model identifies the next flow node to be processed.

At block 2006, in one or more of the various embodiments, the executive engine may be arranged to determine field type information based on the data model associated with the flow model. As described above, the data model describes how data moves through the flow model. In one or more of the various embodiments, data models also include field type information for flow nodes. Accordingly, in one or more of the various embodiments, the field type information for the input fields of the selected flow node determined from the control model.

At block 2008, in one or more of the various embodiments, the executive engine may be arranged to process or transform one or more the flow input data based on the field type information. In one or more of the various embodiments, the data model may be arranged to include one or more data transformation rules that implement the transformation that may be associated with the field type information. As described above, the data transformation rules may be associated with an edge of the data model associating two flow nodes. For example, the execution engine may be arranged to execute data transformation rules that cast the input data to a particular field type or raise an error if the casting the input data to the field type is disallowed.

At block 2010, in one or more of the various embodiments, the executive engine may be arranged to update the context information associated with the flow node. In one or more of the various embodiments, these updates may include the field type transformations. Also, in one or more of the various embodiments, the original flow inputs may be retained in the context information as well. Next, in some embodiments, control may be returned to a calling process.

Figure 21:
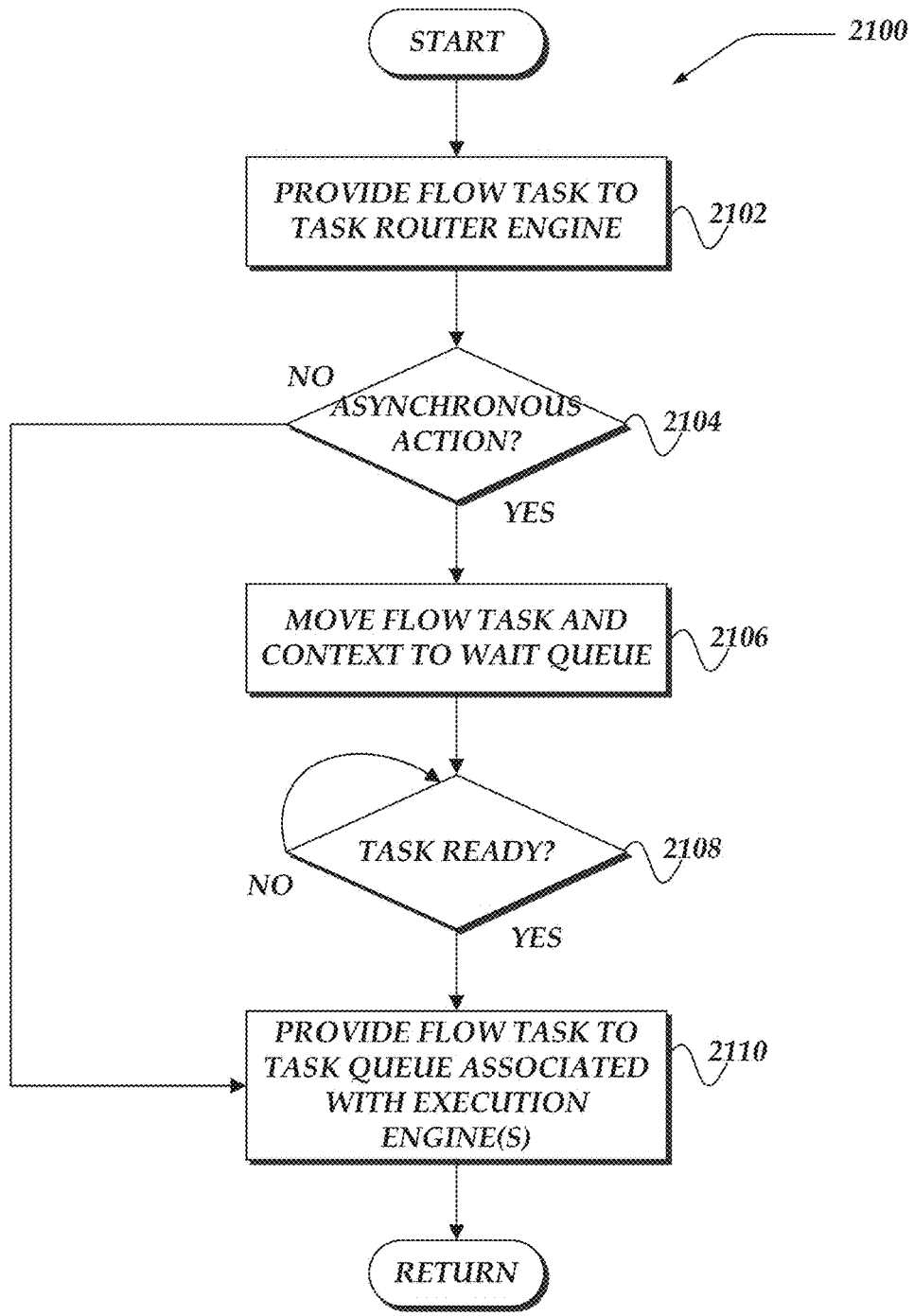
FIG. 21 illustrates a flowchart for a process for processing asynchronous task in accordance with at least one of the various embodiments.

FIG. 21 illustrates a flowchart for process 2100 for processing asynchronous task in accordance with at least one of the various embodiments. After a start block, at block 2102, in at least one of the various embodiments, a flow task may be provided to a task router engine.

At decision block 2104, in one or more of the various embodiments, if one or more the actions associated with the flow task are asynchronous actions, control may flow to block 2106; otherwise, control may be returned to a calling process. In one or more of the various embodiments, one or actions embedded in a flow task may be marked or otherwise tagged asynchronous. Or, in some embodiments, the flow task action may include a call to an API that corresponds to asynchronous behavior. In contrast, in one or more of the various embodiments, flow tasks that do not include asynchronous actions may be provided to the execution engine or task queue to execute its actions.

At block 2106, in one or more of the various embodiments, the flow task performing the asynchronous actions and its context information may be routed to a wait queue.

At decision block 2108, in one or more of the various embodiments, if the suspended flow task is ready, control may flow to block 2110; otherwise, control may loop back to decision block 2108 to wait for the asynchronous action to finish or otherwise conclude.

At block 2110, in one or more of the various embodiments, the task router engine may provide the flow a task queue that is associated with an execution engine. In one or more of the various embodiments, if a task router engine is notified that the suspended flow task is ready to continue running, it may pick up the flow task and assign it to a task queue that is associated with an execution engine. Next, in some embodiments, control may be returned to a calling process.

Figure 22:
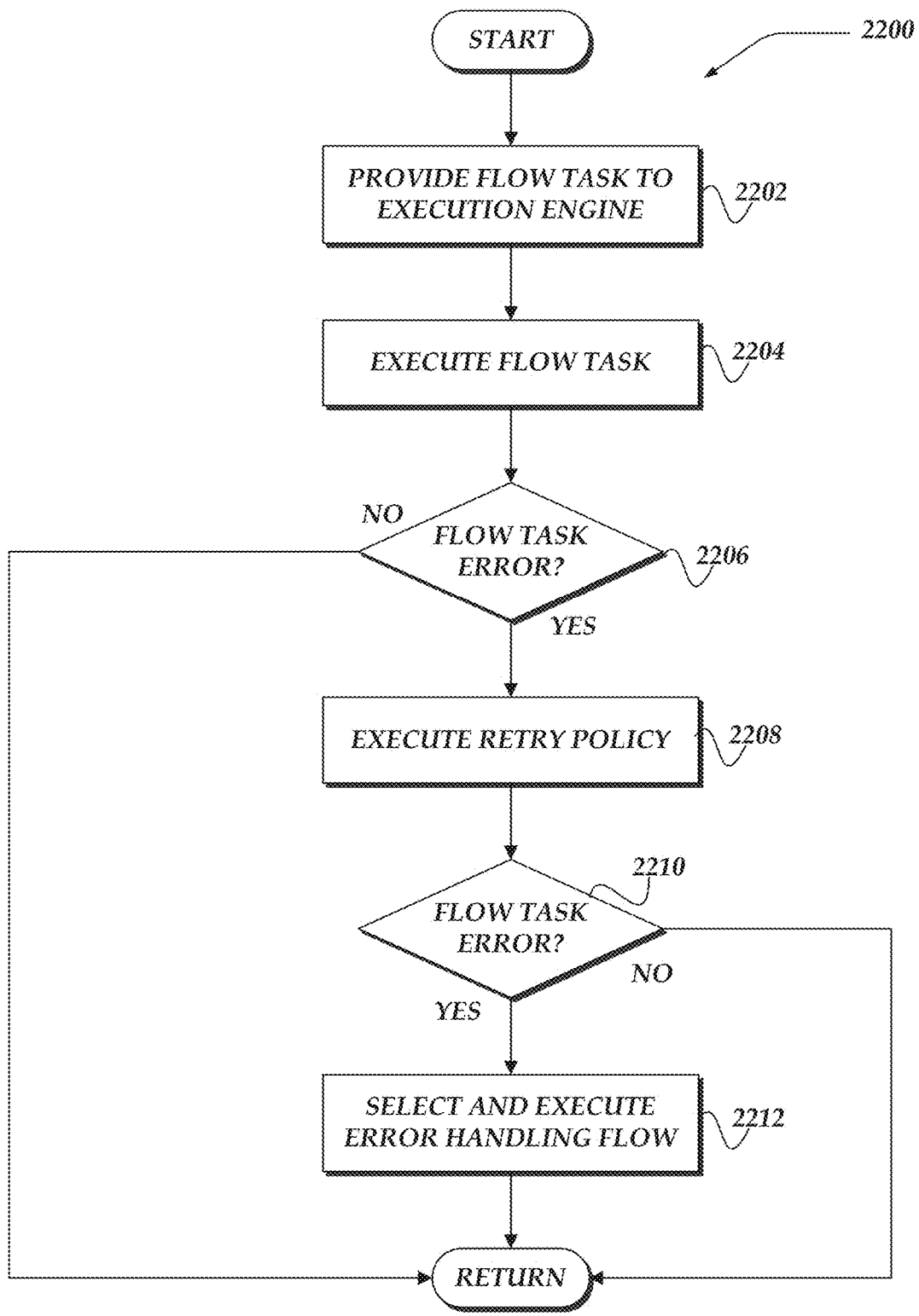
FIG. 22 illustrates a flowchart for a process for error handling for flow models in accordance with at least one of the various embodiments.

FIG. 22 illustrates a flowchart for process 2200 for error handling for flow models in accordance with at least one of the various embodiments. After a start block, at block 2202, in at least one of the various embodiments, a flow task may be provided to an execution engine.

At block 2204, in one or more of the various embodiments, the execution engine may begin executing the flow task. As described above, flow task in a task queue may be selected for execution by an execution engine.

At decision block 2206, in one or more of the various embodiments, if there may be a flow task error, control may flow to block 2208; otherwise, control may be returned to a calling process. In some cases, an error may be raised while the execution if trying to perform one or more actions that comprise the flow task. For example, in some embodiments, if an external service is slow to respond to a request for a flow task, it may be arranged to report a timeout error if the delay exceeds a timeout value. Likewise, in some embodiments, a flow task may be arranged to have timeout value, that may raise an error if it expires. Also, other errors, such as unexpected results, missing values, bad types, or the like, may cause errors to be raised.

At block 2208, in one or more of the various embodiments, one or more retry policies associated with the flow task may be executed. In one or more of the various embodiments, flow nodes may be arranged to have a retry policy. In one or more of the various embodiments, a retry policy may define the number of times that a task operation may be retried before a failure reported an error.

Accordingly, in one or more of the various embodiments, reliability may be improved for flow tasks that are expected to work with external services where performance may be affected by predictable (but not fatal) problems. For example, some external services may become congested such that they remain operative but may be slower than normal. Similarly, in some settings, network access to services or other portions of the flow model (e.g., flow tasks running on distant computers) may be unreliable. In this example, dropping connections or dropping network packets may be expected where network reliability is known to be poor. Accordingly, for this example, raising errors every time a connection drops or some packets are lost in transit may be an unnecessary distraction since the network is known to be unreliable.

In one or more of the various embodiments, retry policies may include a retry value that sets the number times the failed operation may be retried. Also, in some embodiments, retry policies may be arranged employ various escalation techniques. In some embodiments, retry policies may be arranged to have a define pause time to wait before executing a retry. In some embodiments, the pause time may be defined using a function rather than a static value. For example, a retry policy may be arranged to retry a task five times with pause time of $Tn=2^n$ seconds. Accordingly, in this example: after the first failure, the pause time will be 2 seconds; after the second failure, the pause time will be 4 seconds; and so on.

In one or more of the various embodiments, different retry policies may be assigned for different failure conditions. For example, for a given flow node, timeout failure may be assigned one retry policy while unexpected or missing results may be assigned another retry policy.

At decision block 2210, in one or more of the various embodiments, if there still is a flow task error, control may be passed to block 2212; otherwise, control may be returned to a calling process.

At block 2212, in one or more of the various embodiments, an error handling flow may be selected and executed. In one or more of the various embodiments, if errors are still occurring after the retry policies (if any) are exhausted, the executive engine may be arranged to select an error handling flow model that includes one or more flow nodes arranged to run an error handling process. In one or more of the various embodiments, the error process may be arranged to perform actions represented by flow nodes in the error flow model. For example, the error flow model may be arranged to unwind or undue one or more actions that the failing flow model may have partially completed. Likewise, error flow models may be arranged to log the error, send notifications, or the like. Generally, in one or more of the various embodiments, an error flow model is a flow model that may have an arbitrary number of flow nodes.

In one or more of the various embodiments, during the design of a flow, a flow designer may select or define a value or result that may be returned or provided if an error is encountered. Thus, in some embodiments, if an error is encountered, a defined value or result may be returned rather than launching an error handling flow.

Next, in one or more of the various embodiments, control may be returned to a calling process.

Figure 23:
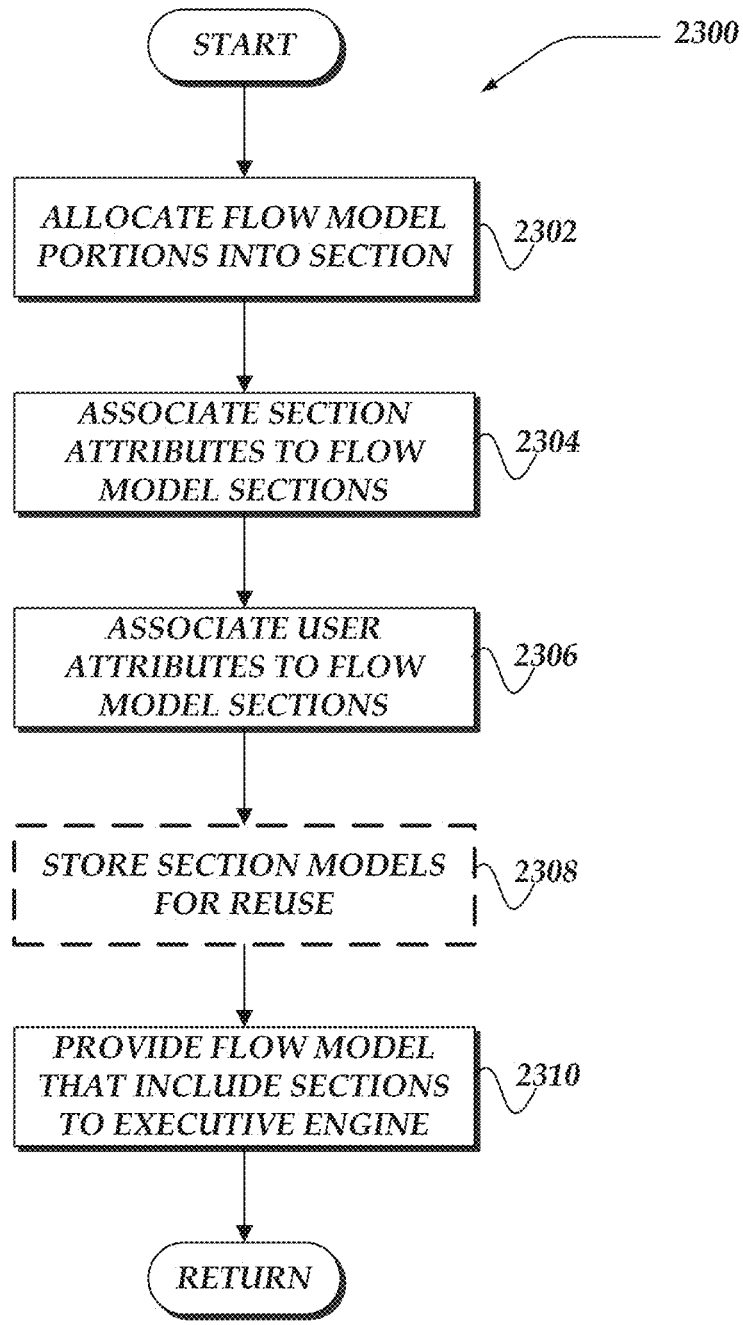
FIG. 23 illustrates a flowchart for a process for configuring flow sections in accordance with at least one of the various embodiments.

FIG. 23 illustrates a flowchart for process 2300 for configuring flow sections in accordance with at least one of the various embodiments. After a start block, at block 2302, in at least one of the various embodiments, one or more flow model sections may be allocated. In one or more of the various embodiments, one or more portions of flow models may be assigned to a section. In one or more of the various embodiments, a flow model section may be one or more flow nodes in a flow model that are grouped into a section.

In one or more of the various embodiments, flow model sections may be portions of the flow model that may be arranged to use in the other flow model. In one or more of the various embodiments, flow model sections may include a set of flow nodes that perform a workflow portions that may be reused in more than one flow model. For example, in some embodiments, if three flow nodes work together to perform common partial-process they may be arranged into a flow model section. Then the three flow nodes may be included as a flow model section into other flow models to perform the same partial-process in the other flow models.

In one or more of the various embodiments, flow section models enable complex multi-step sub-process to be re-used in other flow models. Accordingly, in one or more of the various embodiments, changes or updates made to flow nodes in a flow model section may automatically be propagated to the one or more flow models that include the flow model section.

In one or more of the various embodiments, flow model sections may be defined by selecting flow nodes from an existing flow model. In other embodiments, flow model sections may be expressly designed as flow model sections.

In one or more of the various embodiments, section information, including one or more section attributes may be associated with one or more visualization model nodes (e.g., user-interface cards) included in a visualization model. Accordingly, in some embodiments, the modeling engine may be arranged to generate one or more flow model sections that correspond to the visualization model section.

At block 2304, in one or more of the various embodiments, one or more section attributes may be associated to one or more of the flow sections. In one or more of the various embodiments, modifications made to flow model sections may be propagated to each flow model that may include the flow model section. In one or more of the various embodiments, modifications made to flow nodes comprising a flow model section may be automatically propagated to the flow models that include the flow model section.

In one or more of the various embodiments, flow model section attributes may include task routing directives that may be applied by the task router engine to assign the flow tasks associated with a flow model section to particular task queues or execution platforms. For example, if a flow model section is assigned to run on user mobile computers, all the flow tasks generated from flow nodes in the section may be assigned to a task queue that enables them to be executed by execution engines running on the user's mobile computer.

In one or more of the various embodiments, section information, including one or more section attributes may be associated with one or more visualization model nodes (e.g., user-interface cards) included in a visualization model. Accordingly, in some embodiments, the modeling engine may be arranged to assigning section attributes to flow nodes based on the section information included in the visualization model.

At block 2306, in one or more of the various embodiments, one or more user attributes may be associated with one or more of the flow sections. In one or more of the various embodiments, user attributes may include user permissions, user notifications, or the like. For example, in some embodiments, one or more users may be restricted from modifying flow model sections. In this example, one or more users may be given administration/write authority and other users may be given the authority to use the flow model section but not modify it.

At block 2308, in one or more of the various embodiments, optionally, one or more sections may be stored for re-use with one or more other flow models. In one or more of the various embodiments, flow model sections may be saved to a memory or database so they may be selected for adding to other flow models.

In one or more of the various embodiments, this block may be considered optional because flow model sections may be arranged to be remain part of their original flow model rather than shared with others.

At block 2310, in one or more of the various embodiments, the flow model with flow sections may be provided to an executive engine for running. In one or more of the various embodiments, flow models that include flow model sections may be executed by the executive engine just the same as other flow models. Next, control may be returned to a calling process.

Figure 24:
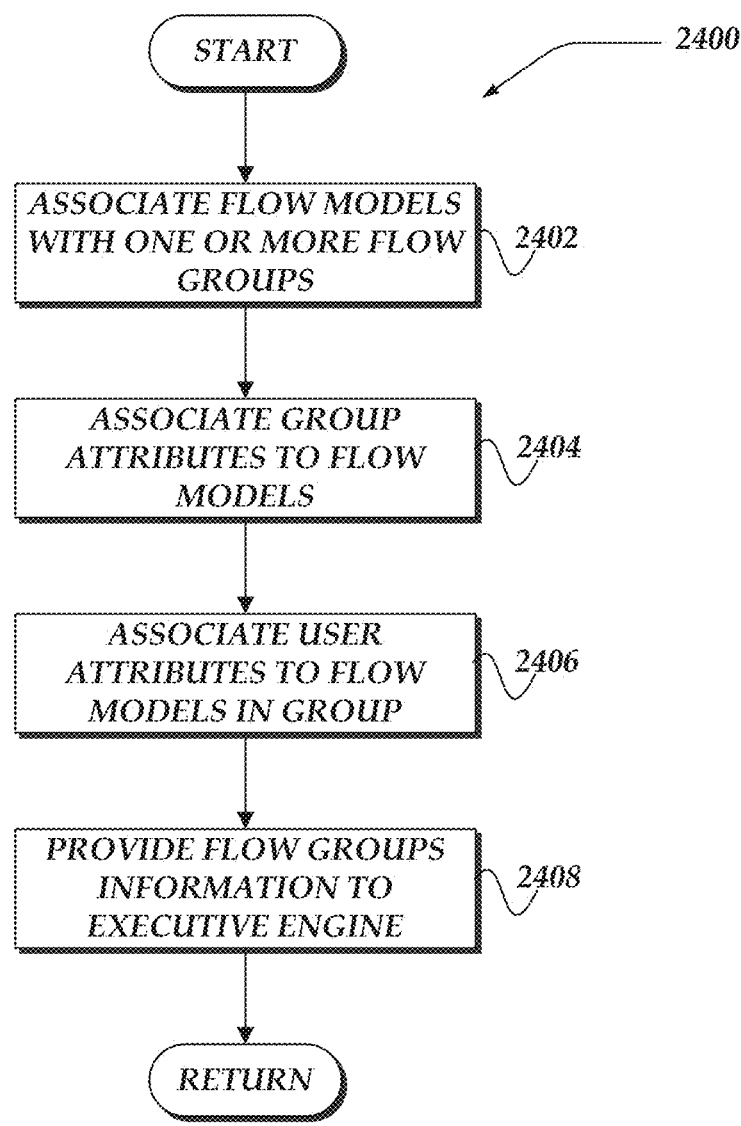
FIG. 24 illustrates a flowchart for a process for configuring flow groups in accordance with at least one of the various embodiments.

FIG. 24 illustrates a flowchart for process 2400 for configuring flow groups in accordance with at least one of the various embodiments. After a start block, at block 2402, in at least one of the various embodiments, one or more flow models may be associated with one or more flow groups. For example, a user may select one or more flow models to make a flow model group.

At block 2404, in one or more of the various embodiments, one or more group attributes may be associated with the flow models in groups. In one or more of the various embodiments, various attributes, such as execution platforms, resource allocations/quota, priority, or the like, may be assigned to the flow models in a flow group by setting attributes to their flow group.

At block 2406, in one or more of the various embodiments, one or more user attributes may be associated with the flow group and its included flow models. Similar to flow model sections described above, user permissions, access rights, or the like, may be assigned to flow groups.

At block 2408, in one or more of the various embodiments, the flow group information may be provided to the executive engine to employ when running flows. In one or more of the various embodiments, if a flow model is associated with a flow group, the executive engine may be arranged to apply the group attributes to the flow model during the execution. Next, control may be returned to a calling process.

Figure 25:
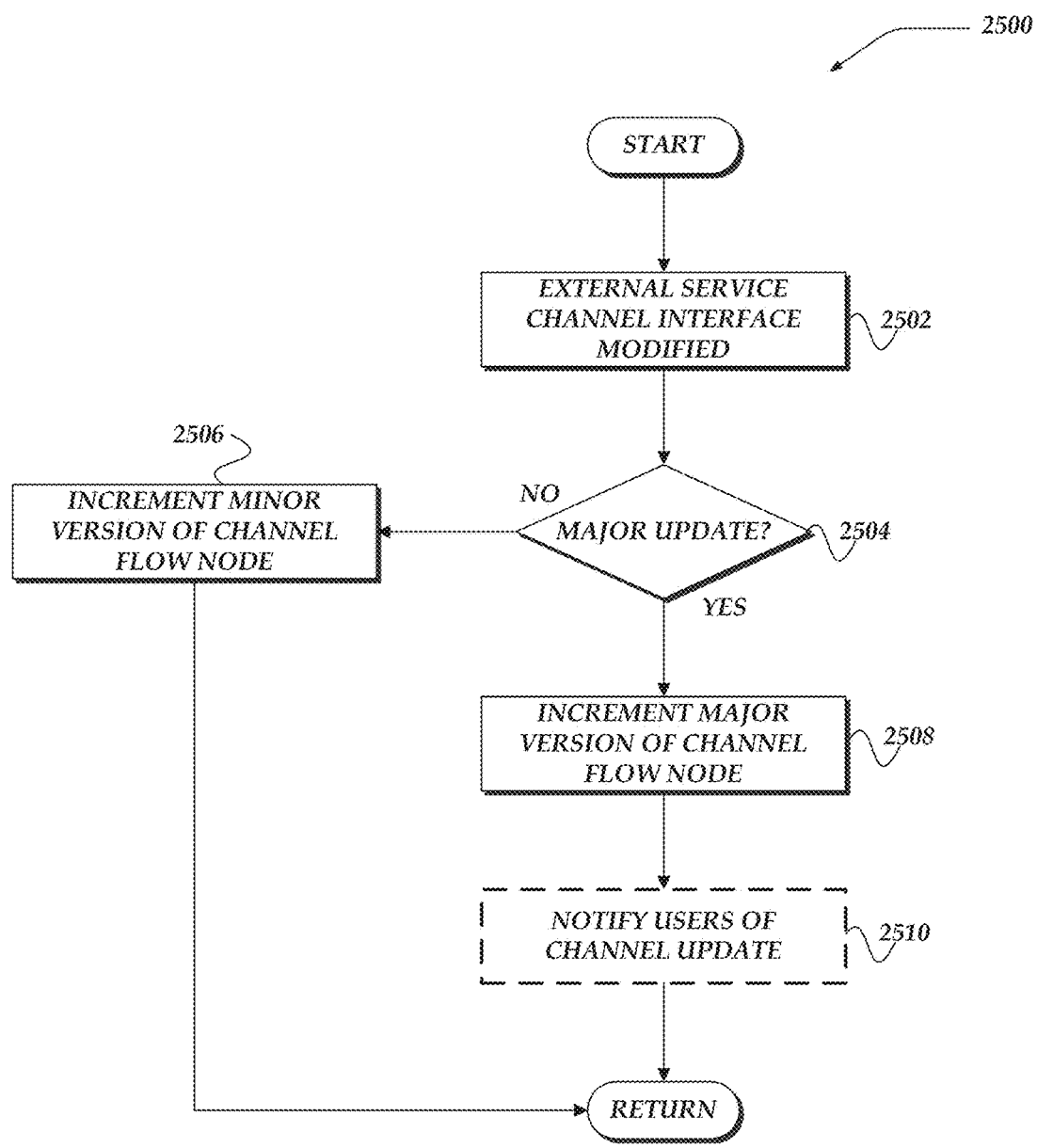
FIG. 25 illustrates a flowchart for a process for managing flow model versions in accordance with at least one of the various embodiments.

FIG. 25 illustrates a flowchart for process 2500 for managing flow model versions in accordance with at least one of the various embodiments. After a start block, at block 2502, in at least one of the various embodiments, external service channel interface and/or behavior may be modified. In one or more of the various embodiments, from time to time one or more services that a flow model may be integrated with change their interfaces, APIs, inputs, outputs, or the like. Accordingly, in one or more of the various embodiments, some of these changes may cause errors to occur unless the impacted flow models are updated. Also, in some embodiments, some changes to integrated services may introduce additional features and/or optimizations that a flow model could be arranged to exploit.

In one or more of the various embodiments, channel flow nodes may be specialized flow nodes that are arranged to interface with a service. In one or more of the various embodiments, different services may require different channel flow nodes. In some embodiments, the channel flow nodes may have specialized interfaces that may be customized for integration with external services. For example, a channel flow node that interfaces with a particular search engine may be arranged to perform actions consistent with APIs published by that search engine provider. Likewise, a channel flow node that interfaces with another search engine may be arranged to perform actions consistent with APIs published by that other search engine provider.

Accordingly, in one or more of the various embodiments, channel flow nodes may be arranged to pass parameters to their associated service. Likewise, channel flow nodes may be arranged to receive results from their associated service. Thus, if the service API changes, corresponding channel flow nodes may need to updated to remain consistent with the service API In one or more of the various embodiments, sometimes services may support more than one version of interfaces. In other cases, services may support just a single interface version.

In one or more of the various embodiments, service interface changes may be discovered in various ways, such as change reports provided by the service operator, automatic change detection using one or more reflection methods (e.g., Java reflection methods), or the like. In one or more of the various embodiments, each time an interface to a service changes, the executive engine may be arranged to update a version number that associated with the service.

In one or more of the various embodiments, the version number may be arranged to have at least two portions. One portion representing the major version and another portion representing a minor version. For example, version number 10.2 may be read as major version 10 minor version 2. In one or more of the various embodiments, if the service interface introduces a breaking changing that is not backward compatible, the major version number may be incremented. Likewise, if the service interface introduces a non-breaking change the minor version number may be incremented.

In one or more of the various embodiments, updates that result in fields being added to a service interface may be considered minor updates whereas updates the result in fields being remove from a service interface may be considered major updates.

Also, in one or more of the various embodiments, channel flow nodes may be associated with a version number that uses the major minor arrangement as well. A channel flow node that is updated to the latest version of the service interface may have the same major version number and the same minor version number.

In one or more of the various embodiments, the impact of mismatches between a service interface version number and a channel flow node version number depends on whether the major version number is different or the minor version number is different. If the major versions are different the channel flow node may be considered obsolete and/or broken. If the major version numbers of a service interface and it associated channel flow node are the same, the channel flow node may be considered functional and useable.

At decision block 2504, in one or more of the various embodiments, if the update to the service is a major update, control may pass to block 2508; otherwise, control may transfer to block 2506.

In one or more of the various embodiments, changes to services may be classified as major or minor updates. In one or more of the various embodiments, major updates may be considered changes that may be inconsistent with previous versions of the service. Accordingly, in one or more of the various embodiments, major update may be considered changes that may cause errors that may interrupt the operation of a flow model. In one or more of the various embodiments, minor updates may be considered changes that do not break existing flow models or otherwise cause errors or disruptions.

At block 2506, in one or more of the various embodiments, since the update may be a minor update the minor version number associated with the service interface may be incremented. Likewise, in one or more of the various embodiments, channel flow nodes that are updated to support the minor changer may also have their minor version number incremented.

At block 2508, in one or more of the various embodiments, since the change is a major change, the major version number associated with the service interface may be incremented. In one or more of the various embodiments, since this represents a major version change, existing channel flow nodes may need to be updated to avoid causing errors. In some embodiments, if the channel flow node is updated to support the change in the service interface, its major version number may be incremented.

At block 2510, in one or more of the various embodiments, optionally, users that may now be using out-of-date channel flow node may be notified. In one or more of the various embodiments, the service may offer a grace period that allows the "old" interfaces to be used for a given time period. Accordingly, notifying users of the pending changes may give them time to update their flow models to accommodate the change. Next, in some embodiments, control may be returned to a calling process.

Figure 26:
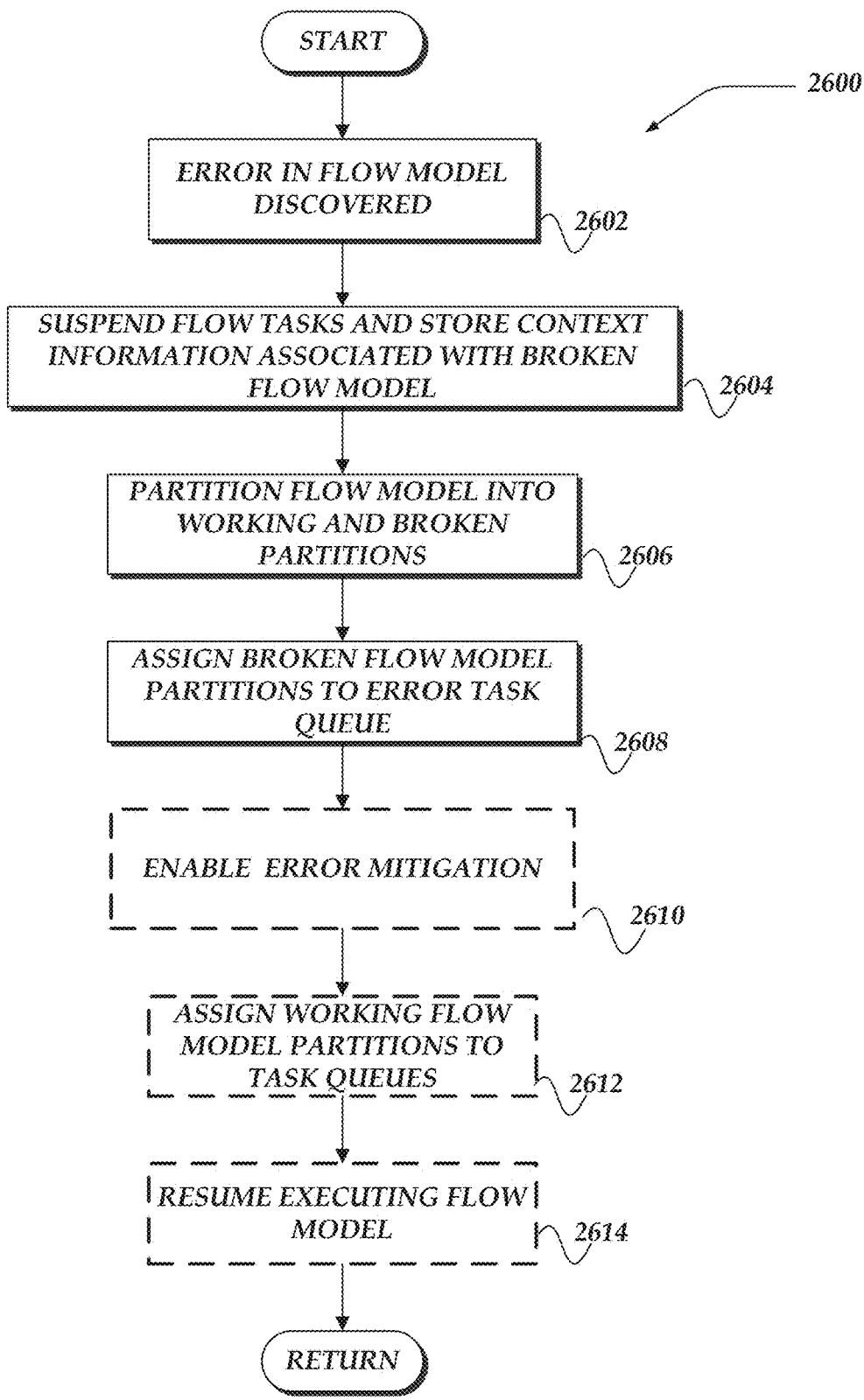
FIG. 26 illustrates an overview flowchart of a process for processing flow models that may produce errors in accordance with at least one of the various embodiments.

FIG. 26 illustrates an overview flowchart of process 2600 for processing flow models that may produce errors in accordance with at least one of the various embodiments. After a start block, at block 2602, in at least one of the various embodiments, during the execution of a flow model, one or more errors may be discovered. In one or more of the various embodiments, if retry policies and/or error handling flows associated with the flow model have been exhausted and the flow model is still producing an error condition the flow model may be considered broken.

At block 2604, in one or more of the various embodiments, flow tasks of the broken model may be suspended and the context information for the broken flow model may be stored to preserve data and state information associated with the broken flow model. In one or more of the various embodiments, the executive engine may be arranged to suspend flow tasks associated with the broken flow model to release execution engines from processing flow tasks that may fail so they may execute tasks associated with unbroken flow models.

Also, in one or more of the various embodiments, the executive engine may store the context information associated with the broken flow model and preserve it for later analysis. In some embodiments, context information may be copied to a designated storage area for broken flow models. Accordingly, in some embodiments, the context information may be removed from high performance storage areas, leaving more room for the execution of unbroken flow models.

Further, in one or more of the various embodiments, the stored context information associated with the broken flow model may be used to retry one or more transactions later if the broken flow model is repaired or corrected. Accordingly, in one or more of the various embodiments, data provided from upstream services, service channels, flow nodes, or the like, may be preserved to use if transactions associated with the broken flow model are re-tried.

At block 2606, in one or more of the various embodiments, the broken flow model may be partitioned into working partitions and broken partitions. In one or more of the various embodiments, the executive engine may analyze the context information of the broken flow model and the broken flow model itself to identify one or more portions of the flow model that may be causing the errors.

Accordingly, in one or more of the various embodiments, the executive engine may be arranged to traverse the broken flow model to partition the flow model into working and broken partitions. In one or more of the various embodiments, the executive engine may identify the one or more flow nodes that produced errors. If one or more error producing flow nodes are discovered, the executive engine may traverse the flow model and attempt to bi-sect the graph to isolate the one or more broken flow nodes into one or more partitions. For example, in some embodiments, the executive engine may identify sub-trees (graph partitions) of the flow model that include flow nodes that produced errors. Likewise, in some embodiments, the executive engine may traverse the flow model to identify sub-trees (e.g., graph partitions) that may be unassociated with error causing nodes.

Also, in one or more of the various embodiments, the executive engine may identify one or more error causing embedded flow models that may be embedded in the subject flow model. Accordingly, the embedded flow model may be considered an error causing partition.

At block 2608, in one or more of the various embodiments, the identified broken flow model partitions may be isolated and assigned to an error task queue. Accordingly, in some embodiments, flow tasks associated with the broken flow model partitions may be suspended and assigned to one or more error task queues that may be designated for running flow tasks associated with broken flow model partitions. Further, in some embodiments, the executive engine and/or the task router engine may be arranged to route incoming flow tasks that may be associated with broken flow model partitions to the error task queues.

At block 2610, in one or more of the various embodiments, optionally, error mitigation may be enabled. In one or more of the various embodiments, the context information associated with an error or broken flow model may be viewed or modified.

In one or more of the various embodiments, a user-interface may be provided that enables a user or administrator to view the current state of the context information. Accordingly, the user may be enabled to modify the context information before retrying, continuing, or restarting the broken flow model. For example, in one or more of the various embodiments, if the execution of a flow model has failed because an upstream task fails to provide data required for a downstream task, the context information may be manually modified to include the missing data. Likewise, corrupt or incorrect data in the context information may be corrected or removed.

In one or more of the various embodiments, one or more rules or heuristics may be applied to automatically modify the context information of a broken flow model. For example, if a known error/failure breaks the flow, a rule may be arranged to identify the error and automatically make one or more repair to the context information. Note, in one or more of the various embodiments, the rule, process, or operations that may be arranged to automatically correct a broken flow may also be defined as another flow model.

At block 2612, in one or more of the various embodiments, optionally, the working flow model partitions may be assigned to normal task queues.

At block 2614, in one or more of the various embodiments, the executive engine may resume execution of the flow model now that the broken flow model partitions are isolated to error task queues. In one or more of the various embodiments, the broken flow model partitions may be located in portions of the flow model that may execute rarely. Alternatively, the working partitions may be perform important processes so the user may want them to remain running.

In one or more of the various embodiments, since the flow tasks associated with the broken flow model partitions are isolated from the production execution engines, the flow tasks associated with the broken flow model partition may be executed without impacting the performance of the flow tasks associated with working flow model partitions. In some embodiments, block 2610 and block 2612 may be considered optional because the entire flow model experiencing errors may be suspended at the user discretion. Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing online computer services using a network computer that performs actions comprising:
   instantiating a visualization of a visualization model of a process that includes a plurality of card user-interfaces that are arranged for user display and user interaction based on the visualization model; and
   instantiating a modeling engine that employs the visualization model to perform further actions, including:
      providing a flow model based on the visualization model that is arranged for one or more of processing or data modeling, wherein the flow model includes two or more flow nodes and one or more edges that associate one or more multi-directional flow fields as both inputs and outputs of the one or more flow nodes;
      providing a control model overlaid on the flow model, wherein the control model shares the one or more flow nodes and the one or more edges;
      providing a data model overlaid on the flow model that includes one or more data model edges, wherein the data model shares the one or more flow nodes and at least a portion of the one or more edges, and wherein the data model and the control model that are overlaid on the flow model share a display of a same topology for laying out the one or more flow nodes and the at least portion of the one or more edges, wherein each of the one or more edges separately associated with just the control model or the data model are presented differently in the display of the same topology;

employing geo-location information provided by a global positioning systems (GPS) device at a client computer to determine one or more features that are included in the visual presentation to improve a user's understanding of the plurality of card interfaces for the user display and the user interaction, wherein these features include one or more of time zones, languages, currencies, or calendar formatting that is displayed to the user of the client computer when the client computer is located at a particular geo-location;

associating one or more data transformation rules with one or more of the one or more data model edges, wherein the one or more data edges are associated with a flow node that produces data and another flow node that consumes data; and configuring and arranging a memory to store the flow model, the data model, and the control model; and instantiating an executive engine to perform actions including:

executing that executes the flow model using one or more execution engines, wherein the executive engine selects the one or more execution engines based on one or more of heuristics to identify an execution engine that has access to enough resources to handle a load or binding an operation of the flow model to a particular execution engine for secure execution;

in response to discovery of one or more errors in the flow model, performing actions, comprising:

suspending each task associated with the flow model and storing context information associated with the flow model;

partitioning the flow model into one or more broken partitions associated with the one or more discovered errors and one or more working partitions non-associated with the one or more discovered errors, wherein the one or more broken partitions are assigned to an error task queue, and wherein the one or more working partitions are assigned to a task queue; and resuming execution of the flow model; and employing a hardware security module, installed in the network computer, to provide tamper resistant safeguards for generation and management of cryptographic information used for secure communication over a network.

2. The method of claim 1, further comprising:
associating field type information with one or more fields of one or more of the plurality of card user-interfaces; and
employing the modeling engine to modify the data model to include data transformation rules that correspond to the field type information.

3. The method of claim 1, further comprising:
traversing the visualization model to select one or more visualization model nodes associated with the plurality of card user-interfaces; and
transforming the one or more visualization model nodes into the one or more flow nodes.

4. The method of claim 1, further comprising, modifying the control model by associating one or more retry policies with the one or more flow nodes, wherein the one or more retry policies define a maximum number of automatic retries for one or more flow tasks associated with the one or more flow nodes.

5. The method of claim 1, further comprising, modifying the control model by associating one or more error handling flow models with the one or more flow nodes, wherein the one or more error handling flow models define a separate process for handling one or more discovered errors.

6. The method of claim 1, further comprising, when the visualization model references one or more embedded flow models, associating the one or more embedded flow models with the flow model, wherein the one or more embedded flow models is linked to one or more of the one or more flow nodes.

7. The method of claim 1, wherein providing the flow model based on the visualization model, further comprises:
providing one or more section attributes based on section information included in the visualization model; and
associating the one or more section attributes with one or more of the one or more flow nodes based on the section information.

8. A system for managing online computer services, comprising:
a network computer, comprising:
a transceiver that communicates over the network;
a memory that stores at least instructions; and
one or more processor devices that execute instructions that perform actions, including:
instantiating a visualization engine to provide a visualization of a visualization model of a process that includes a plurality of card user-interfaces that are arranged for user display and user interaction based on the visualization model; and
instantiating a modeling engine that employs the visualization model to perform further actions, including:
providing a flow model based on the visualization model that is arranged for one or more of processing or data modeling, wherein the flow model includes two or more flow nodes and one or more edges that associate one or more multi-directional flow fields as both inputs and outputs of the one or more flow nodes;
providing a control model overlaid on the flow model, wherein the control model shares the one or more flow nodes and the one or more edges;
providing a data model overlaid on the flow model that includes one or more data model edges, wherein the data model shares the one or more flow nodes and at least a portion of the one or more edges, and wherein the data model and the control model that are overlaid on the flow model share a display of a same topology that includes the one or more flow nodes and the at least portion of the one or more edges, wherein each of the one or more edges separately associated with just the control model or the data model are presented differently in the display of the same topology;

employing geo-location information provided by a global positioning systems (GPS) device at a client computer to determine one or more features that are included in the visual presentation to improve a user's understanding of the plurality of card interfaces for the user display and the user interaction, wherein these features include one or more of time zones, languages, currencies, or calendar formatting that is displayed to the user of the client computer when the client computer is located at a particular geo-location;

associating one or more data transformation rules with one or more of the one or more data model edges, wherein the one or more data edges are associated with a flow node that produces data and another flow node that consumes data; and configuring and arranging a memory to store the second flow model, the data model, and the control model; and instantiating an executive engine to perform actions including:

executing that executes the flow model using one or more execution engines, wherein the executive engine selects the one or more execution engines based on one or more of heuristics to identify an execution engine that has access to enough resources to handle a load or binding an operation of the flow model to a particular execution engine for secure execution;

in response to discovery of one or more errors in the flow model, performing actions, comprising:

suspending each task associated with the flow model and storing context information associated with the flow model;

partitioning the flow model into one or more broken partitions associated with the one or more discovered errors and one or more working partitions non-associated with the one or more discovered errors, wherein the one or more broken partitions are assigned to an error task queue, and wherein the one or more working partitions are assigned to a task queue; and resuming execution of the flow model; and employing a hardware security module, installed in the network computer, to provide tamper resistant safeguards for generation and management of cryptographic information employed for secure communication over a network; and the client computer, comprising:

the GPS device;

a client computer transceiver that communicates over the network;

a client computer memory that stores at least instructions; and one or more processor devices that execute instructions that perform actions, including:

displaying the visualization model in the visualization presentation to the user.

9. The system of claim 8, further comprising:

associating field type information with one or more fields of one or more of the plurality of card user-interfaces; and employing the modeling engine to modify the data model to include data transformation rules that correspond to the field type information.

10. The system of claim 8, further comprising:

traversing the visualization model to select one or more visualization model nodes associated with the plurality of card user-interfaces; and transforming the one or more visualization model nodes into the one or more flow nodes.

11. The system of claim 8, wherein the one or more network computer processor devices execute instructions that perform actions, further comprising, modifying the control model by associating one or more retry policies with the one or more flow nodes, wherein the one or more retry policies define a maximum number of automatic retries for one or more flow tasks associated with the one or more flow nodes.

12. The system of claim 8, wherein the one or more network computer processor devices execute instructions that perform actions, further comprising, modifying the control model by associating one or more error handling flow models with the one or more flow nodes, wherein the one or more error handling flow models define a separate process for handling one or more discovered errors.

13. The system of claim 8, wherein the one or more network computer processor devices execute instructions that perform actions, further comprising, when the visualization model references one or more embedded flow models, associating the one or more embedded flow models with the flow model, wherein the one or more embedded flow models is linked to one or more of the one or more flow nodes.

14. The system of claim 8, wherein the one or more network computer processor devices execute instructions that perform actions, wherein providing the flow model based on the visualization model, further comprises:

providing one or more section attributes based on section information included in the visualization model; and associating the one or more section attributes with one or more of the one or more flow nodes based on the section information.

15. A processor readable non-transitory storage media that includes instructions for managing online computer services, wherein execution of the instructions by one or more hardware processors performs actions, comprising:

instantiating a visualization engine to provide a visualization of a visualization model of a process that includes a plurality of card user-interfaces that are arranged for user display and user interaction based on the visualization model; and instantiating a modeling engine that employs the visualization model to perform further actions, including:

providing a flow model based on the visualization model that is arranged for one or more of processing or data modeling, wherein the flow model includes two or more flow nodes and one or more edges that associate one or more multi-directional flow fields as both inputs and outputs of the one or more flow nodes;

providing a control model overlaid on the flow model, wherein the control model shares the one or more flow nodes and the one or more edges;

providing a data model overlaid on the flow model that includes one or more data model edges, wherein the data model shares the one or more flow nodes and at least a portion of the one or more edges, and wherein the data model and the control model that are overlaid on the flow model share a display of a same topology that includes the one or more flow nodes and the at least portion of the one or more edges, wherein each of the one or more edges separately associated with just the control model or the data model are presented differently in the display of the same topology;

employing geo-location information provided by a global positioning systems (GPS) device at a client computer to determine one or more features that are included in the visual presentation to improve a user's understanding of the plurality of card interfaces for the user display and the user interaction, wherein these features include one or more of time zones, languages, currencies, or calendar formatting that is displayed to the user of the client computer when the client computer is located at a particular geo-location;

associating one or more data transformation rules with one or more of the one or more data model edges, wherein the one or more data edges are associated with a flow node that produces data and another flow node that consumes data; and configuring and arranging a memory to store the flow model, the data model, and the control model; and instantiating an executive engine to perform actions including:

executing that executes the flow model using one or more execution engines, wherein the executive engine selects the one or more execution engines based on one or more of heuristics to identify an execution engine that has access to enough resources to handle a load or binding an operation of the flow model to a particular execution engine for secure execution;

in response to discovery of one or more errors in the flow model, performing actions, comprising:

suspending each task associated with the flow model and storing context information associated with the flow model;

partitioning the flow model into one or more broken partitions associated with the one or more discovered errors and one or more working partitions non-associated with the one or more discovered errors, wherein the one or more broken partitions are assigned to an error task queue, and wherein the one or more working partitions are assigned to a task queue; and resuming execution of the flow model; and employing a hardware security module, installed in the network computer, to provide tamper resistant safeguards for generation and management of cryptographic information employed for secure communication over a network.

16. The media of claim 15, further comprising:

associating field type information with one or more fields of one or more of the plurality of card user-interfaces; and employing the modeling engine to modify the data model to include data transformation rules that correspond to the field type information.

17. The media of claim 15, further comprising:

traversing the visualization model to select one or more visualization model nodes associated with the plurality of card user-interfaces; and transforming the one or more visualization model nodes into the one or more flow nodes.

18. The media of claim 15, further comprising, modifying the control model by associating one or more retry policies with the one or more flow nodes, wherein the one or more retry policies define a maximum number of automatic retries for one or more flow tasks associated with the one or more flow nodes.

19. The media of claim 15, further comprising, modifying the control model by associating one or more error handling flow models with the one or more flow nodes, wherein the one or more error handling flow models define a separate process for handling one or more discovered errors.

20. The media of claim 15, further comprising, when the visualization model references one or more embedded flow models, associating the one or more embedded flow models with the flow model, wherein the one or more embedded flow models is linked to one or more of the one or more flow nodes.

21. The media of claim 15, wherein providing the flow model based on the visualization model, further comprises:

providing one or more section attributes based on section information included in the visualization model; and associating the one or more section attributes with one or more of the one or more flow nodes based on the section information.

22. A network computer for managing online computer services, comprising:

a transceiver that communicates over the network;

a memory that stores at least instructions; and one or more processor devices that execute instructions that perform actions, including:

instantiating a visualization engine to provide a visualization of a visualization model of a process that includes a plurality of card user-interfaces that are arranged for user display and user interaction based on the visualization model; and instantiating a modeling engine that employs the visualization model to perform further actions, including:

providing a flow model based on the visualization model that is arranged for one or more of processing or data modeling, wherein the flow model includes two or more flow nodes and one or more edges that associate one or more multi-directional flow fields as both inputs and outputs of the one or more flow nodes;

providing a control model overlaid on the flow model, wherein the control model shares the one or more flow nodes and the one or more edges;

providing a data model overlaid on the flow model that includes one or more data model edges, wherein the data model shares the one or more flow nodes and at least a portion of the one or more edges, and wherein the data model and the control model that are overlaid on the flow model share a display of a same topology that includes the one or more flow nodes and the at least portion of the one or more edges, wherein each of the one or more edges separately associated with just the control model or the data model are presented differently in the display of the same topology;

employing geo-location information provided by a global positioning systems (GPS) device at a client computer to determine one or more features that are included in the visual presentation to improve a user's understanding of the plurality of card interfaces for the user display and the user interaction, wherein these features include one or more of time zones, languages, currencies, or calendar formatting that is displayed to the user of the client computer when the client computer is located at a particular geo-location;

associating one or more data transformation rules with one or more of the one or more data model edges, wherein the one or more data edges are associated with a flow node that produces data and another flow node that consumes data; and configuring and arranging a memory to store the flow model, the data model, and the control model; and instantiating an executive engine to perform actions including:

executing that executes the flow model using one or more execution engines, wherein the executive engine selects the one or more execution engines based on one or more of heuristics to identify an execution engine that has access to enough resources to handle a load or binding an operation of the flow model to a particular execution engine for secure execution;

in response to discovery of one or more errors in the flow model, performing actions, comprising:

suspending each task associated with the flow model and storing context information associated with the flow model;

partitioning the flow model into one or more broken partitions associated with the one or more discovered errors and one or more working partitions non-associated with the one or more discovered errors, wherein the one or more broken partitions are assigned to an error task queue, and wherein the one or more working partitions are assigned to a task queue; and resuming execution of the flow model; and employing a hardware security module, installed in the network computer, to provide tamper resistant safeguards for generation and management of cryptographic information employed for secure communication over a network.

23. The network computer of claim 22, further comprising:

associating field type information with one or more fields of one or more of the plurality of card user-interfaces; and employing the modeling engine to modify the data model to include data transformation rules that correspond to the field type information.

24. The network computer of claim 22, further comprising:

traversing the visualization model to select one or more visualization model nodes associated with the plurality of card user-interfaces; and transforming the one or more visualization model nodes into the one or more flow nodes.

25. The network computer of claim 22, further comprising, modifying the control model by associating one or more retry policies with the one or more flow nodes, wherein the one or more retry policies define a maximum number of automatic retries for one or more flow tasks associated with the one or more flow nodes.

26. The network computer of claim 22, further comprising, modifying the control model by associating one or more error handling flow models with the one or more flow nodes, wherein the one or more error handling flow models define a separate process for handling one or more discovered errors.

27. The network computer of claim 22, further comprising, when the visualization model references one or more embedded flow models, associating the one or more embedded flow models with the flow model, wherein the one or more embedded flow models is linked to one or more of the one or more flow nodes.

28. The network computer of claim 22, wherein providing the flow model based on the visualization model, further comprises:

providing one or more section attributes based on section information included in the visualization model; and associating the one or more section attributes with one or more of the one or more flow nodes based on the section information.

* * * * *